(12) United States Patent
Ostwald et al.

(10) Patent No.: US 7,184,238 B1
(45) Date of Patent: Feb. 27, 2007

(54) TRACK IMPEDANCE ANOMALY DETECTION IN AN AUTOMATED DATA STORAGE LIBRARY

(75) Inventors: Timothy C. Ostwald, Louisville, CO (US); Frank T. Smith, Nederland, CO (US); Daniel J. Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 745 days.

(21) Appl. No.: 10/265,553

(22) Filed: Oct. 7, 2002

(51) Int. Cl.
*G11B 15/18* (2006.01)

(52) U.S. Cl. ......................... 360/69; 340/664
(58) Field of Classification Search .................. 360/55, 360/69; 381/19; 323/284; 269/49; 340/664; 700/245; 191/2
See application file for complete search history.

(56) References Cited

U.S. PATENT DOCUMENTS

| | | | |
|---|---|---|---|
| 3,663,755 A * | 5/1972 | Lace ........................... 381/19 |
| 3,733,446 A | 5/1973 | Colovas et al. |
| 4,926,753 A | 5/1990 | Weiss |
| 4,928,245 A | 5/1990 | Moy et al. |
| 4,945,429 A | 7/1990 | Munro et al. |
| 5,237,262 A * | 8/1993 | Ashley et al. .............. 323/284 |
| 5,297,484 A | 3/1994 | Piserchia et al. |
| 5,333,982 A | 8/1994 | Tanizawa et al. |
| 5,429,470 A | 7/1995 | Nicol et al. |
| 5,690,197 A | 11/1997 | Suganuma et al. |
| 5,700,125 A | 12/1997 | Falace et al. |
| 5,870,245 A | 2/1999 | Kersey et al. |
| 5,927,464 A | 7/1999 | Clark et al. |
| 5,953,995 A | 9/1999 | Saillant |
| 5,993,222 A | 11/1999 | Nicolette et al. |
| 6,011,669 A | 1/2000 | Apple et al. |
| 6,025,972 A | 2/2000 | Schmidtke et al. |
| 6,059,509 A | 5/2000 | Ostwald |
| 6,068,436 A | 5/2000 | Black et al. |
| 6,109,568 A | 8/2000 | Gilbert et al. |
| 6,222,699 B1 | 4/2001 | Luffel et al. |
| 6,262,863 B1 | 7/2001 | Ostwald et al. |
| 6,265,839 B1 | 7/2001 | Layton |
| 6,309,162 B1 | 10/2001 | White |
| 6,327,519 B1 | 12/2001 | Ostwald et al. |
| 6,362,746 B2 | 3/2002 | Ostwald |
| 6,386,116 B1 | 5/2002 | Ostwald |
| 6,476,603 B2 | 11/2002 | Clark et al. |
| 6,530,735 B1 | 3/2003 | Trammell |
| 6,668,991 B2 | 12/2003 | Canaday et al. |
| 6,695,359 B2 * | 2/2004 | Morel et al. .................. 269/49 |
| 6,741,182 B1 * | 5/2004 | Smith et al. ................. 340/664 |
| 6,810,306 B1 * | 10/2004 | Ostwald ...................... 700/245 |
| 6,840,360 B1 * | 1/2005 | Ostwald et al. ................ 191/2 |
| 6,885,911 B1 * | 4/2005 | Smith ......................... 700/245 |

\* cited by examiner

*Primary Examiner*—Fred F. Tzeng
(74) *Attorney, Agent, or Firm*—Brooks Kushman P.C.

(57) ABSTRACT

Track anomalies are detected by measuring track impedance. A robotic device is moved along the track. A conductor on the track is contacted with a pair of pickups moved by the robotic device. Track health is determined based on impedance sensed between the pickups.

19 Claims, 29 Drawing Sheets

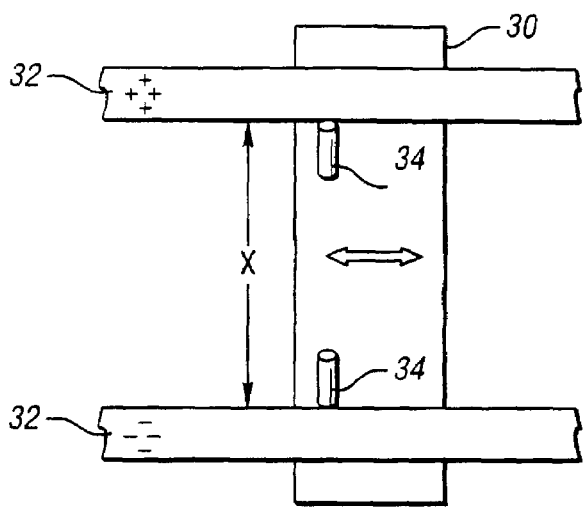
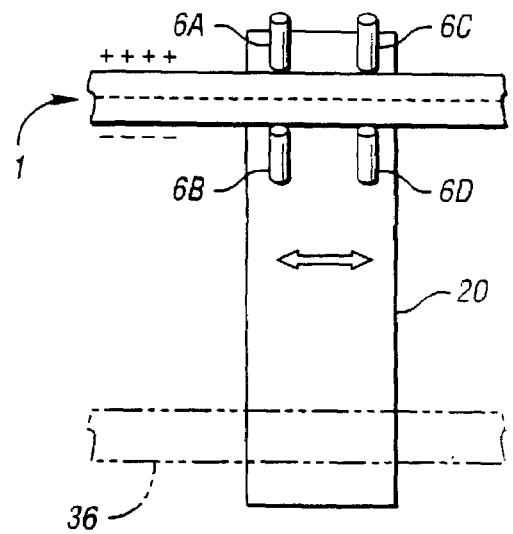
*Fig. 3a*  *Fig. 3b*
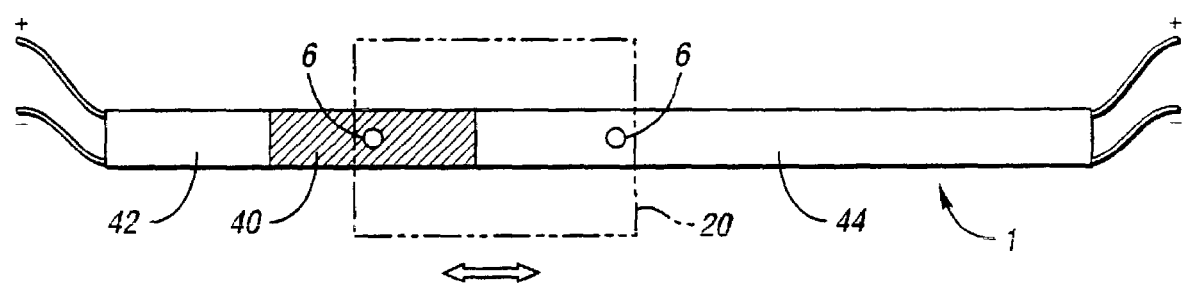
*Fig. 4a*
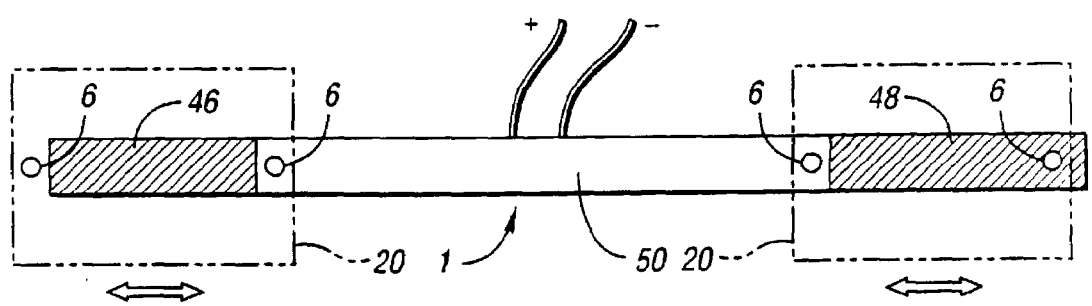
*Fig. 4b*

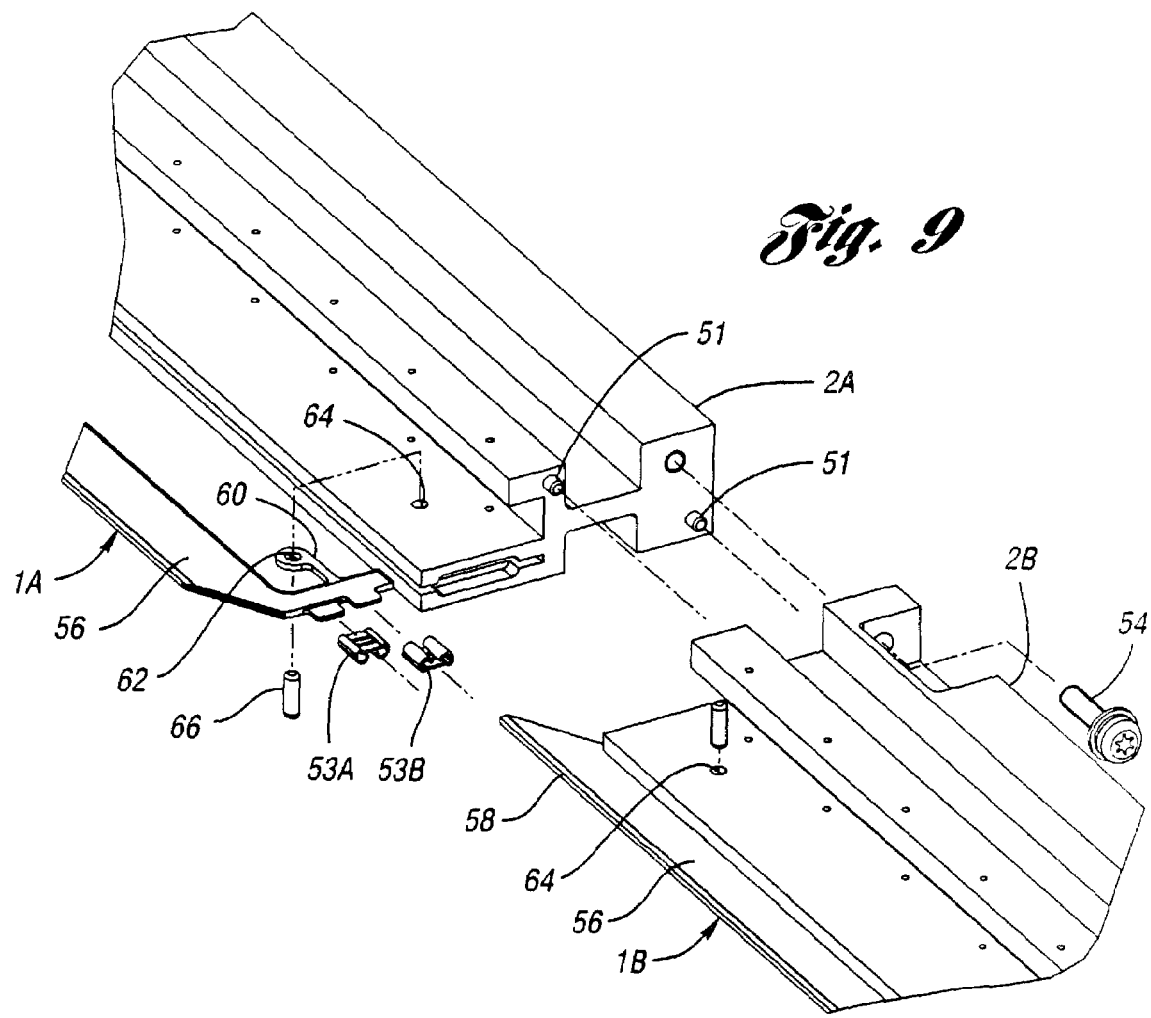
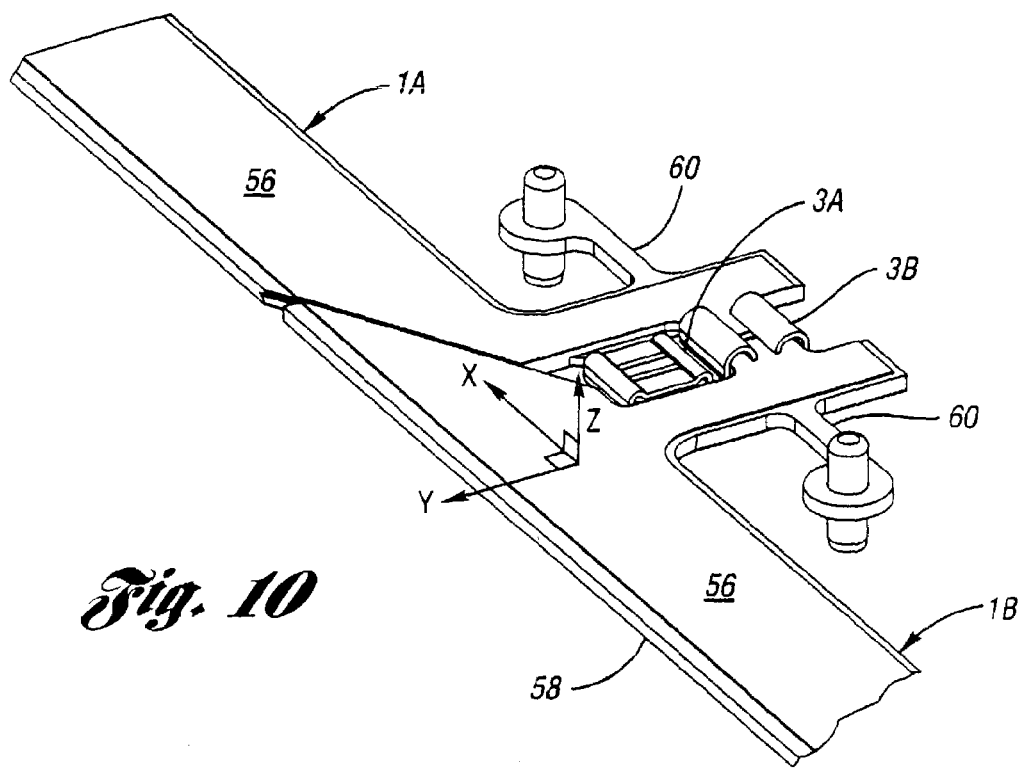

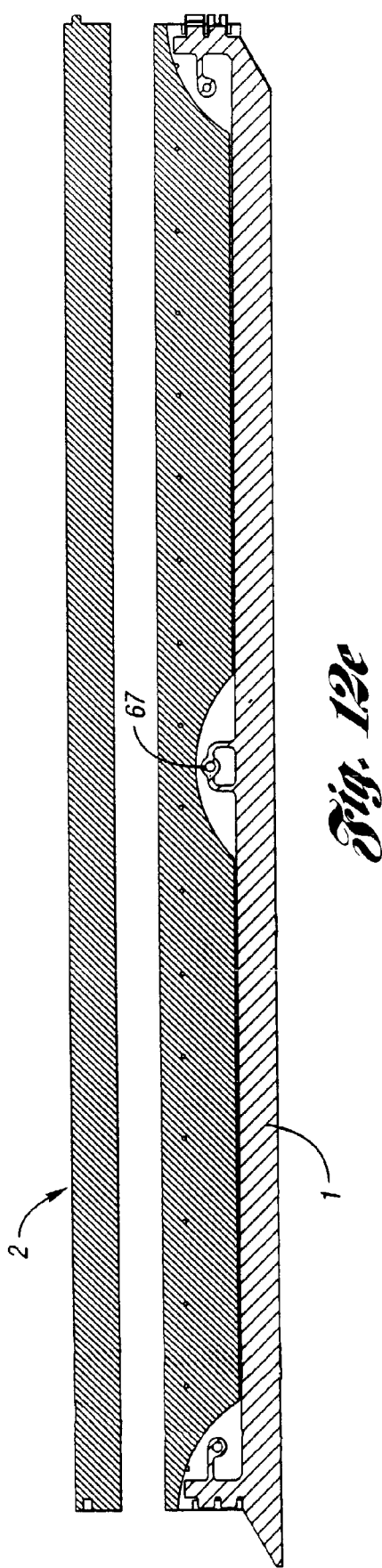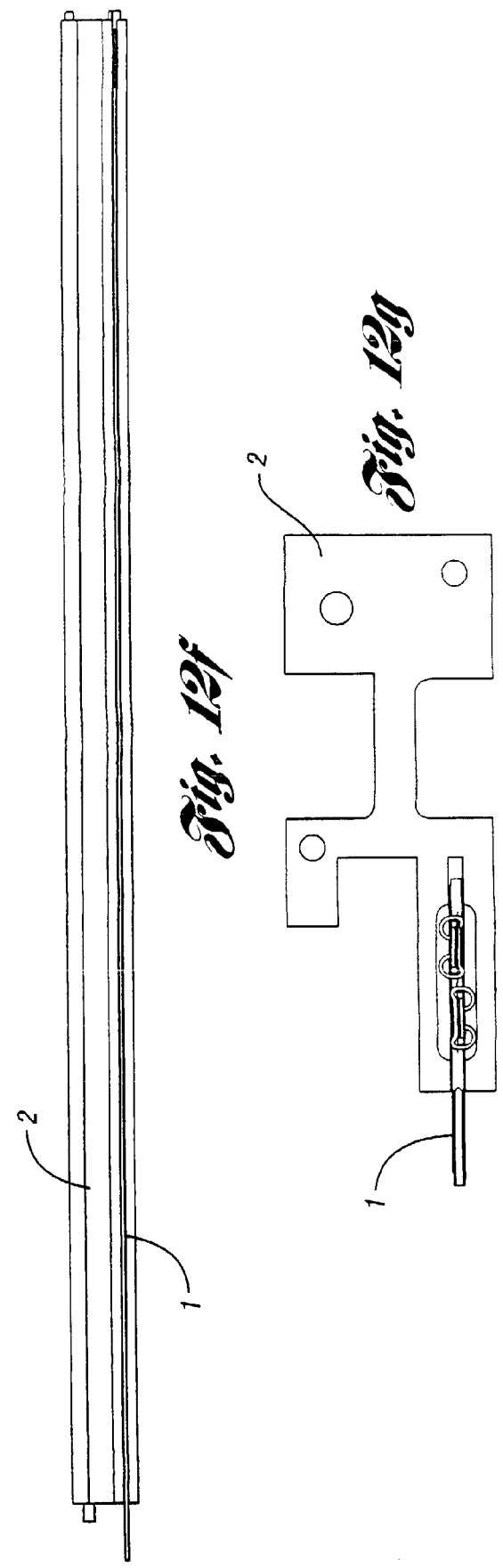

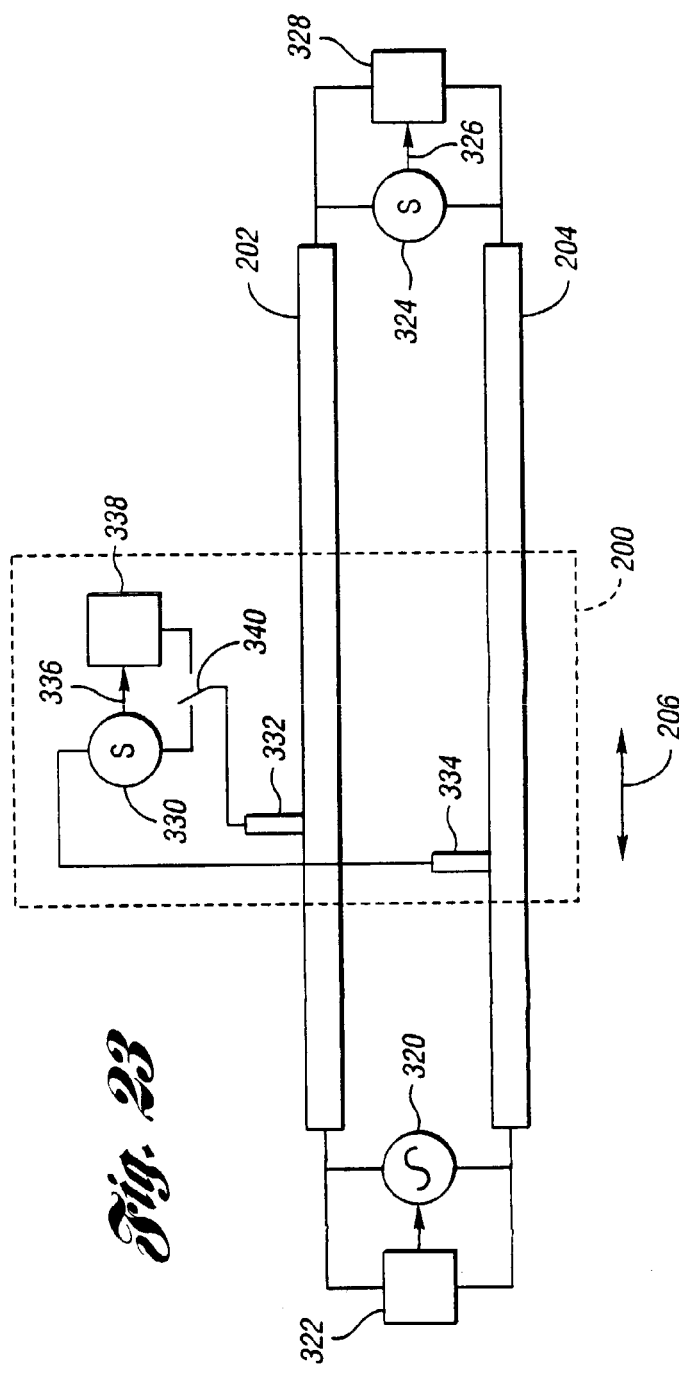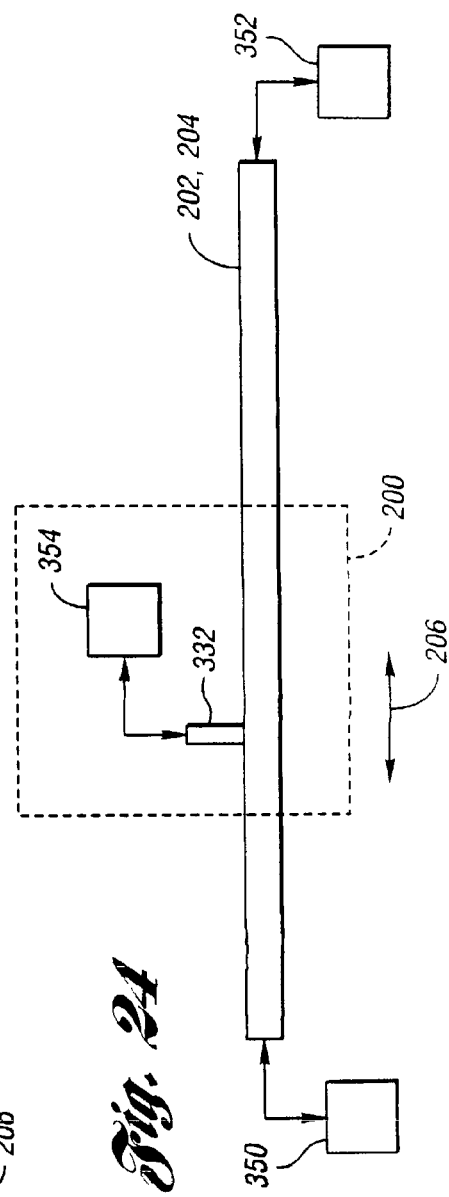

TRACK IMPEDANCE ANOMALY DETECTION IN AN AUTOMATED DATA STORAGE LIBRARY

BACKGROUND OF THE INVENTION

1. Field of the Invention

The present invention relates generally to the detection of track anomalies in data storage libraries.

2. Background Art

Current automated libraries for tape cartridges typically include arrays of multiple storage cells housing the tape cartridges, as well as multiple media drives. Multiple automated robotic devices may be used to move tape cartridges between the various storage cells and media drives within a library.

The use of multiple robotic devices in automated tape cartridge libraries raises various problems concerning the distribution of power to such robotic devices. More particularly, robotic devices used in automated tape cartridge libraries require power for operation thereof. In prior art automated tape cartridge libraries, the movement of the robotic devices is restricted by wire cable connections used for providing such power. That is, such cabling can prevent the robotic devices from crossing paths, or from continuous movement in one direction around the library without the necessity of ultimately reversing direction.

Power cabling can be eliminated through the use of conductors running along tracks which support the robotic devices. Brushes on the robotic devices contact the conductors to supply power to the robotic devices. Alternatively, brushes may be part of a pickup assembly for supplying power to the robotic devices. For example, wheels may contact the conductors with brushes contacting the wheels.

The tracks may cease to function properly through use, age, improper installation, physical damage, and the like. What is needed is to detect anomalies in the tracks.

SUMMARY OF THE INVENTION

Track anomalies are detected by measuring track impedance.

A method for detecting a track anomaly in an automated data storage library is provided. A robotic device is moved along the track. A conductor on the track is contacted with a pair of pickups moved by the robotic device. Impendence of the conductor is sensed between the pickups. Track health is determined based on the sensed conductor impedance.

In an embodiment of the present invention, a reference impedance is determined as the conductor impedance for each track section of interest at a time when the track is operational. The reference impedance for each section of interest is then remembered. Determining track health may then be based on comparing the sensed conductor impedance for a section of interest with a corresponding remembered reference impedance.

In another embodiment of the present invention, sensing impedance includes measuring resistance between the pickups. Sensing impedance may also include taking measurements at a plurality of frequencies.

In yet other embodiments of the present invention, the conductor may carry electrical current supplying power to the robotic device, may carry commands sent to the robotic device, may carry a signal indicative of track health, or the like. The conductor may also simultaneously perform more than one of these functions.

A data storage library is also provided. Storage locations for holding data storage media are disposed within the library. At least one rail is located to provide access to the storage locations. At least one conductor is on each rail. Each conductor carries electrical current. At least one robotic device is mounted to travel along the rail. Each robotic device accesses storage media held in the storage locations. At least one pair of brushes is on each robotic device. Each brush conducts electrical current between the robotic device and the conductor. Electronics determine an operating status of the conductor based on a measurement of impedance between each brush in the pair of brushes.

A method for detecting a track anomaly in a plurality of track sections by measuring an impedance of each section of track is also provided. The track provides access to data storage devices in an automated data storage library by supporting movement of at least one robotic device along the track.

The above features, and other features and advantages of the present invention are readily apparent from the following detailed descriptions thereof when taken in connection with the accompanying drawings.

BRIEF DESCRIPTION OF THE DRAWINGS

FIG. 3a is a simplified block diagram of a robotic device for use in an automated tape cartridge library;

FIG. 3b is a simplified a block diagram of a robotic device for use in an automated tape cartridge library having brush and strip power distribution;

FIGS. 4a and 4b are simplified overhead block diagrams of a power strip and robotic device with conductive brushes for use in an automated tape cartridge libraries that may be used with the present invention;

FIGS. 4c and 4d are simplified electrical schematics depicting power supply redundancy schemes that may be used with the present invention;

FIG. 9 is an exploded perspective view of power strip and guide rail joint for use in an automated tape cartridge library that may be used with the present invention;

FIG. 10 is a perspective view of a power strip joint for use in an automated tape cartridge library that may be used with the present invention;

FIGS. 12c–g are cross-sectional and side views of a power strip and guide rail assembly for use in an automated tape cartridge library;

FIG. 23 is a schematic diagram illustrating track fault detection by impedance measurement;

FIG. 24 is a schematic diagram illustrating embodiments of track fault detection by signal transmission;

DETAILED DESCRIPTION OF THE PREFERRED EMBODIMENTS

Figure 1:
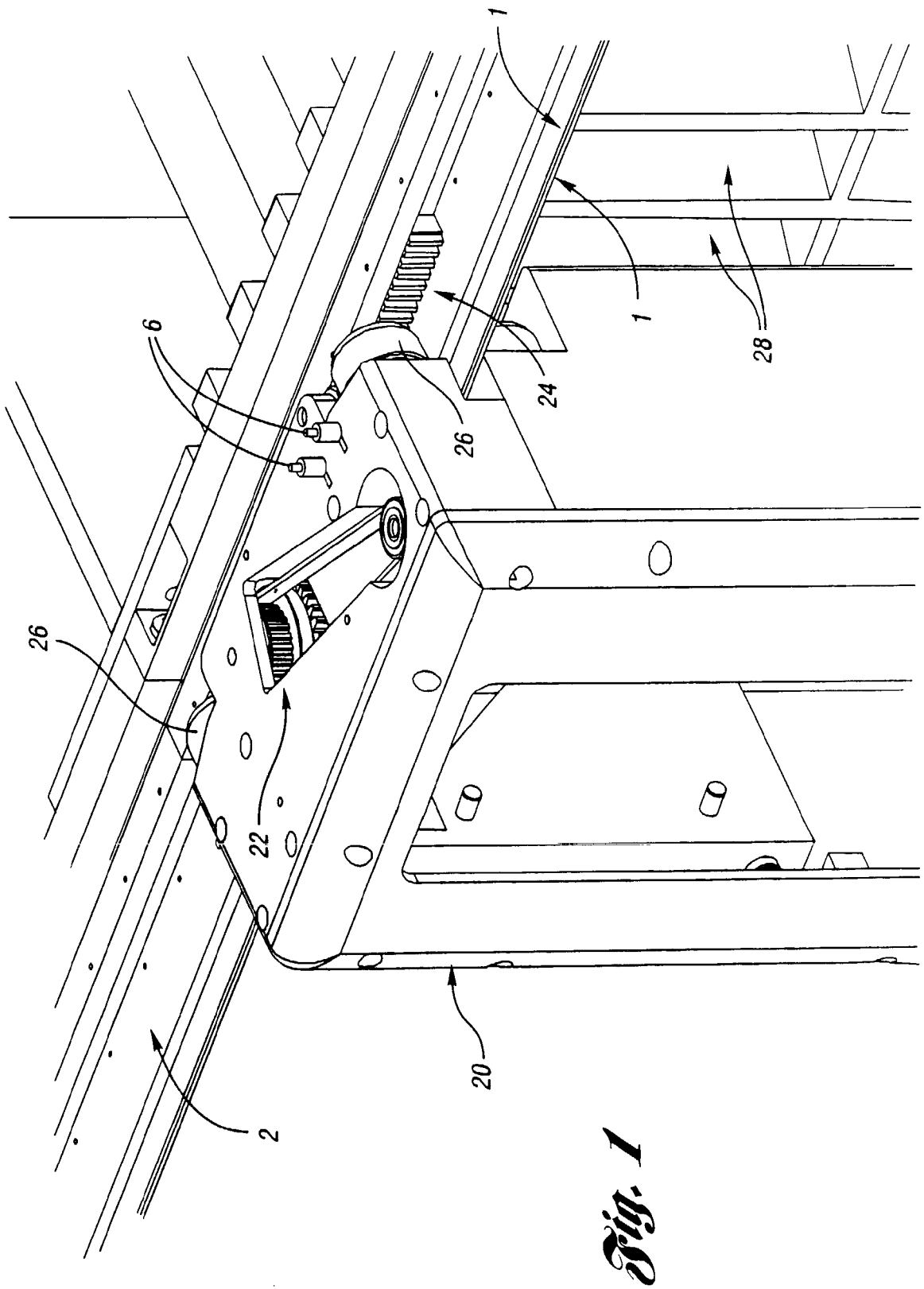
FIG. 1 is a perspective view of a robotic device for use in an automated tape cartridge library having brush and strip power distribution.
Figure 2A:
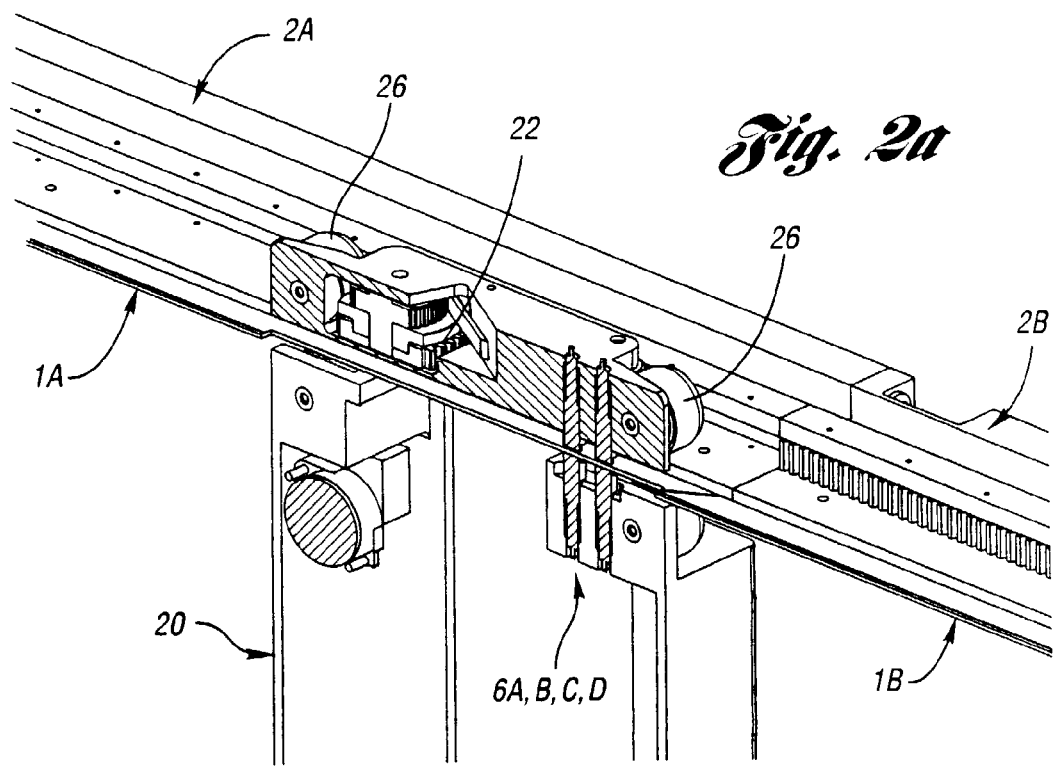
FIGS. 2a and 2b are partial cross-sectional views of a robotic device for use in an automated tape cartridge library having brush and strip power distribution.
Figure 2B:
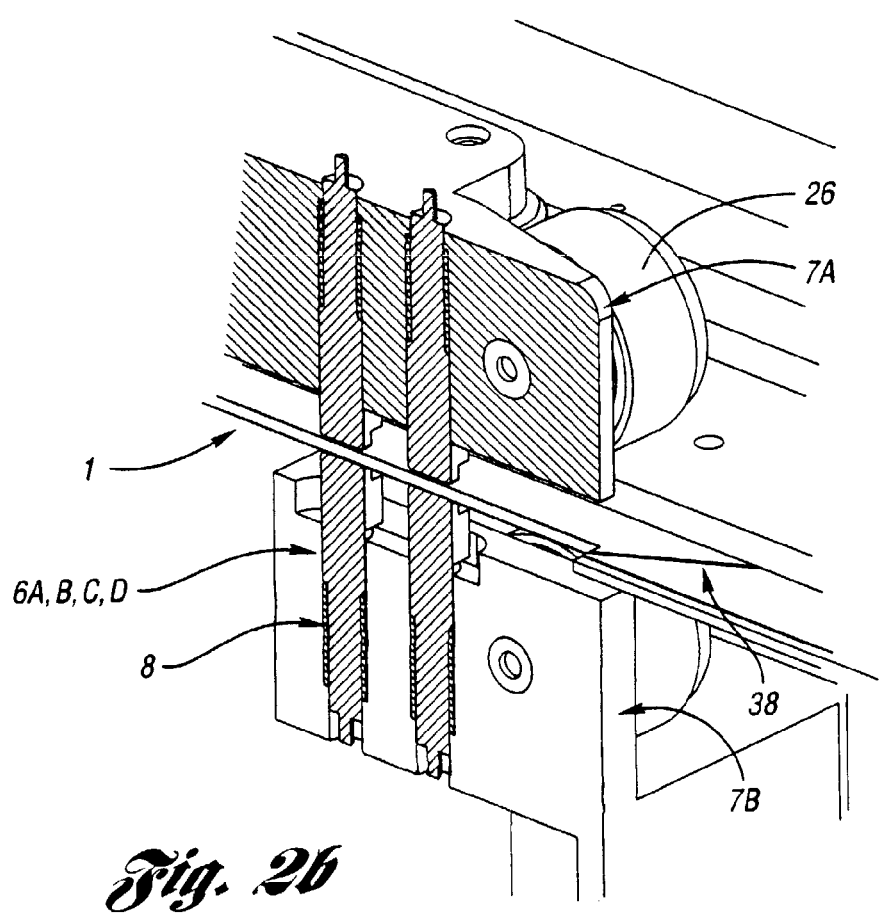

FIGS. 1 and 2a–b show perspective and cross-sectional views, respectively, of a robotic device for use in an automated tape cartridge library having brush and strip power distribution. As seen therein, a moveable robotic device (20), which may be referred to as a "handbot" or "picker," is supported by a guide structure or rail (2) preferably having an integrated power strip or conductor (1). Guide rail (2) and/or power strip (1) may also be referred to as a track. Power strip (1) is a substantially planar elongated member, preferably comprising back-to-back conductive surfaces (1A, 1B), preferably copper, separated by a dielectric (preferably FR4) in a sandwich-like configuration. Power strip (1) may be a printed circuit board wherein copper conductors are laminated, glued or etched onto a substrate material. Alternatively, power strip (1) may comprise copper foil tape glued or laminated onto plastic material, or copper inserts molded into a moldable plastic material. Any other methods of construction or configurations known to those of ordinary skill may also be used.

Robotic device (20) includes brush contacts (6) for providing power to robotic device (20). In that regard, the back-to-back conductive surfaces (1A, 1B) of power strip (1) are oppositely charged. An upper brush (6A) in contact with one conductive surface (1A), in conjunction with a corresponding lower brush (6B) in contact with the opposite conductive surface (1B) thereby supply power to the robotic device (20). Brushes (6) are contained in housing assembly (7) and, to ensure that contact between brushes (6) and power strip (1) is maintained, brushes (6) are spring loaded (8). Multiple or redundant pairs of such upper and lower brushes (6) may be provided, and may be spring loaded (8) independently, to improve robustness and reliability in the event of a brush failure, momentary loss of contact at one or more brushes due to any track irregularities, including seams or joints therein, or voltage irregularities between adjacent power strips (1). Moreover, brushes (6) may have a circular cross-section, such as is provided by a cylindrical shaped brush (6), as these are better able to traverse a joint or seam (38) in the power strip (1), which may more readily impede or catch a square shaped brush. In that regard, as best seen in FIGS. 2a and 2b, brushes (6) may have a substantially flat surface for contacting the conductive surfaces (1A, 1B) of power strip (1).

Power supplied to robotic device (20) through power strip (1) and brushes (6) powers a motor (not shown) in robotic device (20), which in turn drives a belt and gear system (22). Guide rails (2) includes teeth (24) which cooperate with belt and gear system (22) to permit robotic device (20) to move back and forth along guide rails (2) via guide wheels (26). In that regard, it should be noted that power strip (1) preferably provides DC power to robotic device (20). As seen in FIG. 1, robotic device (20) may thereby gain access to tape cartridges stored in library cells (28) located along guide rail (2). It should also be noted that while only a single robotic device (20) is depicted, power strip (1) is preferably suitable, according to any fashion known in the art, to provide power to multiple robotic devices. In that regard, each robotic device (20) is suitably equipped with a circuit breaker (not shown) in any fashion known in the art in order to isolate the robotic device (20) from the power strip (1) in the event that the robotic device short circuits. In such a manner, the failure of the entire power strip (1) is prevented.

Referring now to FIG. 3a, a simplified block diagram of a robotic device for use in an automated tape cartridge library is shown. Robotic device (30) in an automated tape cartridge library has a pair of spaced apart, oppositely charged power rails (32). The robotic device (30) is provided with a pair of brush contacts (34) for supplying power from two power rails (32) to the robotic device (30), in order to allow movement of the robotic device (30). As seen in FIG. 3a, the large distance, x, between a cooperating pair of brushes (34) creates uneven wear on the brushes (34) due to construction tolerances in the robotic device (30) and the track or power rails (32). Brushes (34) also causes uneven drag on the robotic device (30) by creating a moment load resulting from the separation, x, between the brush (34) and power rail (32) friction points.

FIG. 3b is a simplified a block diagram of a robotic device for use in an automated tape cartridge library having common rail brush and strip power distribution. Power is supplied to the robotic device (20) through the power strip (1) and brush (6) configuration described in connection with FIGS. 1 and 2a–b, thereby facilitating the elimination of the large separation between a pair of cooperating brushes (6A, 6B), and the accompanying problems, and allowing for lower construction tolerance requirements. The single rail construction, two-sided power strip (1) and brush (6) configuration also acts to reduce costs and provides for a more integrated assembly. As seen in FIG. 3b, an optional, non-powered lower guide rail (36) may also be provided for robotic device (20). It should also be noted that the copper foil tape that may be used in the construction of the power strip (1) may be installed in the field during the assembly of the automated library. In such a fashion, it may be possible to eliminate all electrical joints in power strip (1) by using a continuous copper foil strip.

Figure 4C:
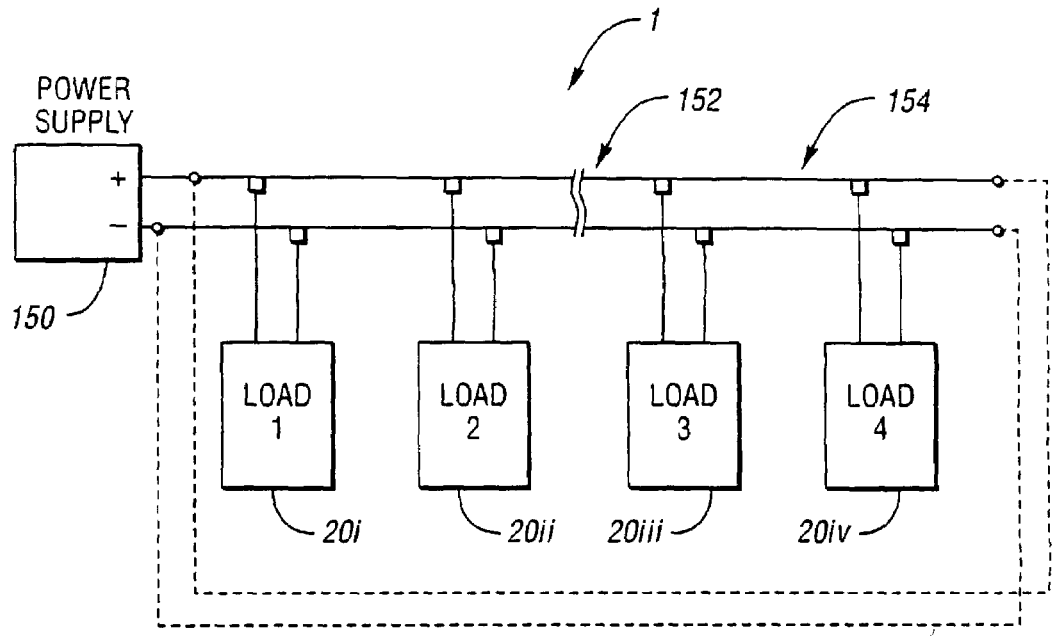
Figure 4B:
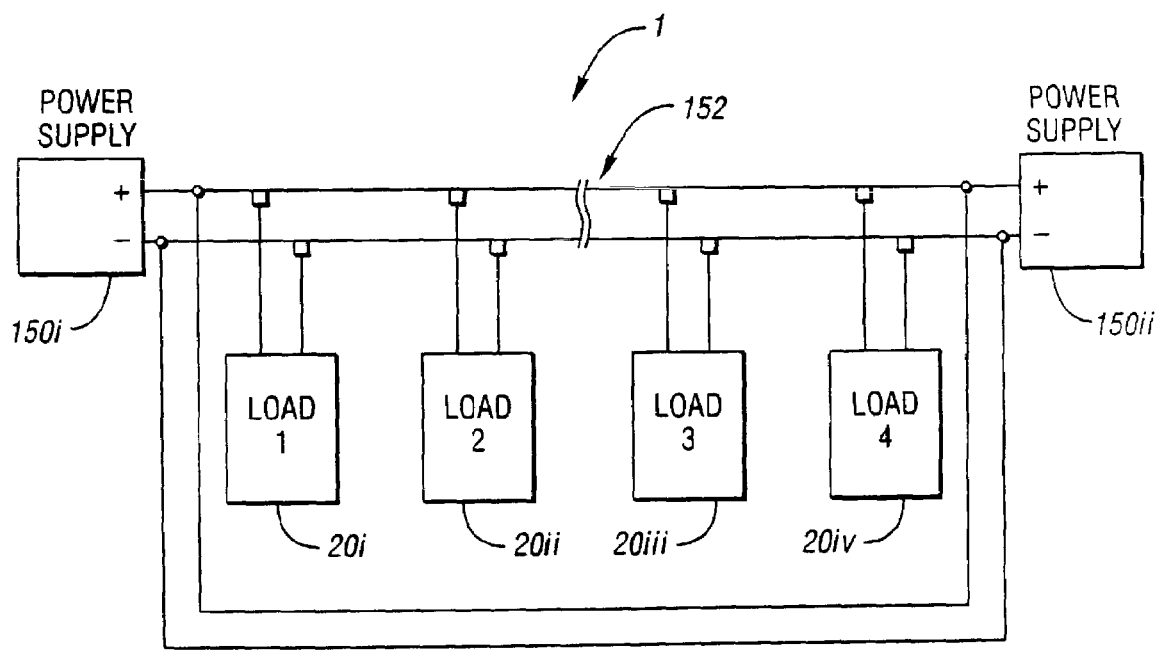
Figure 5:
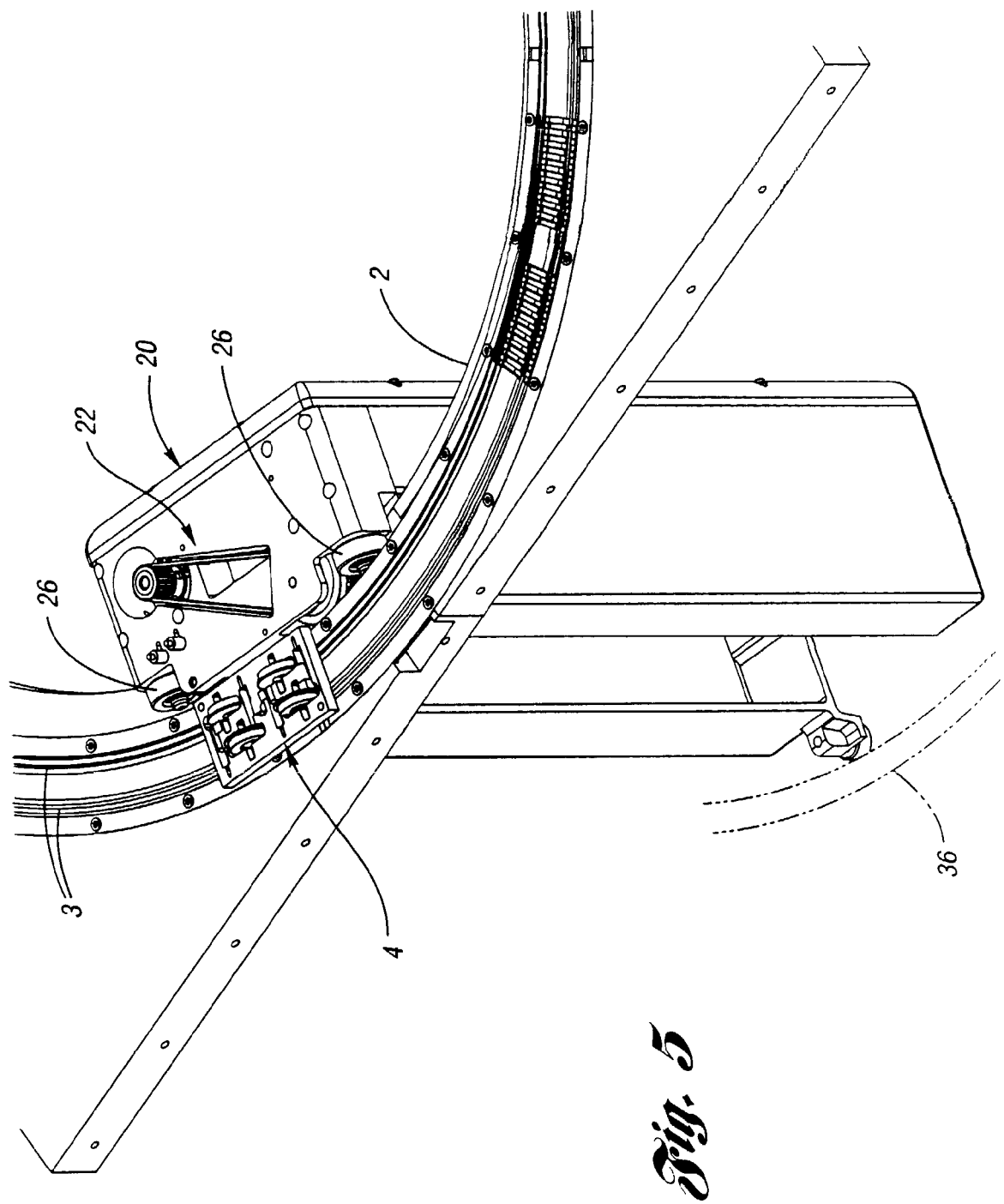
FIG. 5 is a perspective view of a robotic device for use in an automated tape cartridge library having brush and wheel power distribution that may be used with the present invention.
Figure 6:
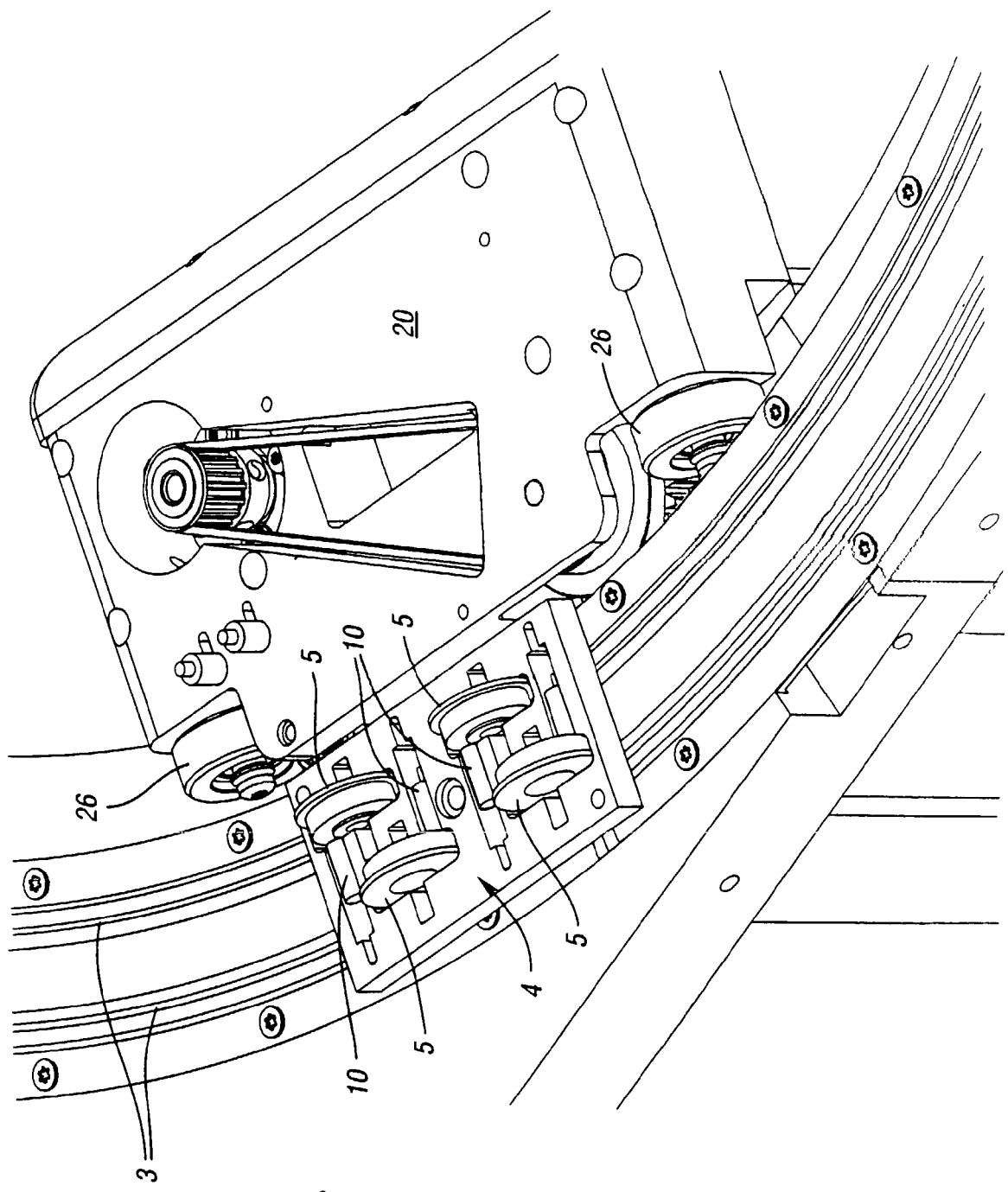
FIG. 6 a more detailed perspective view of a robotic device for use in an automated tape cartridge library having brush and wheel power distribution that may be used with the present invention.
Figure 7:
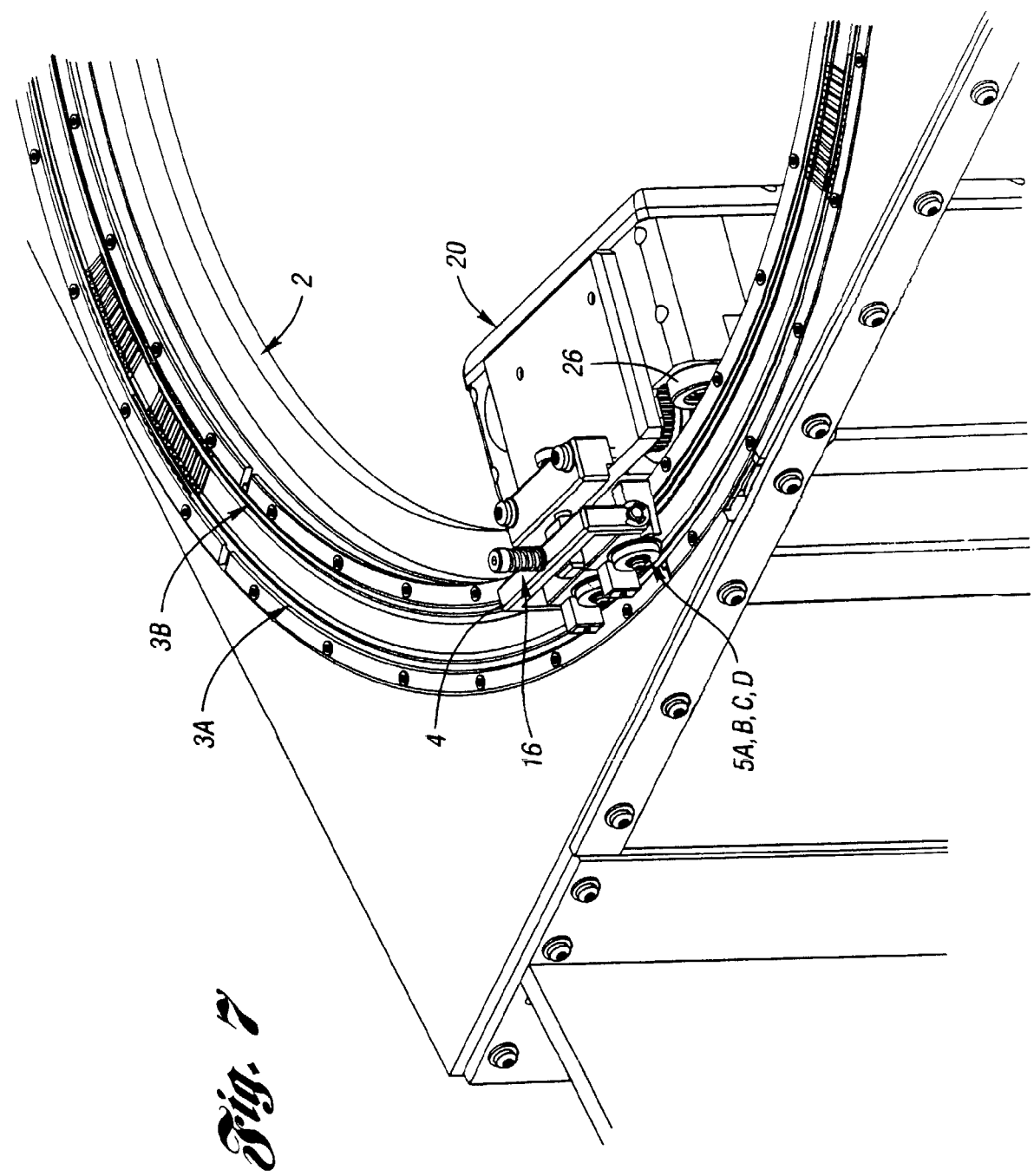
FIG. 7 is another more detailed perspective view of a robotic device for use in an automated tape cartridge library having brush and wheel power distribution that may be used with the present invention.
Figure 8A:
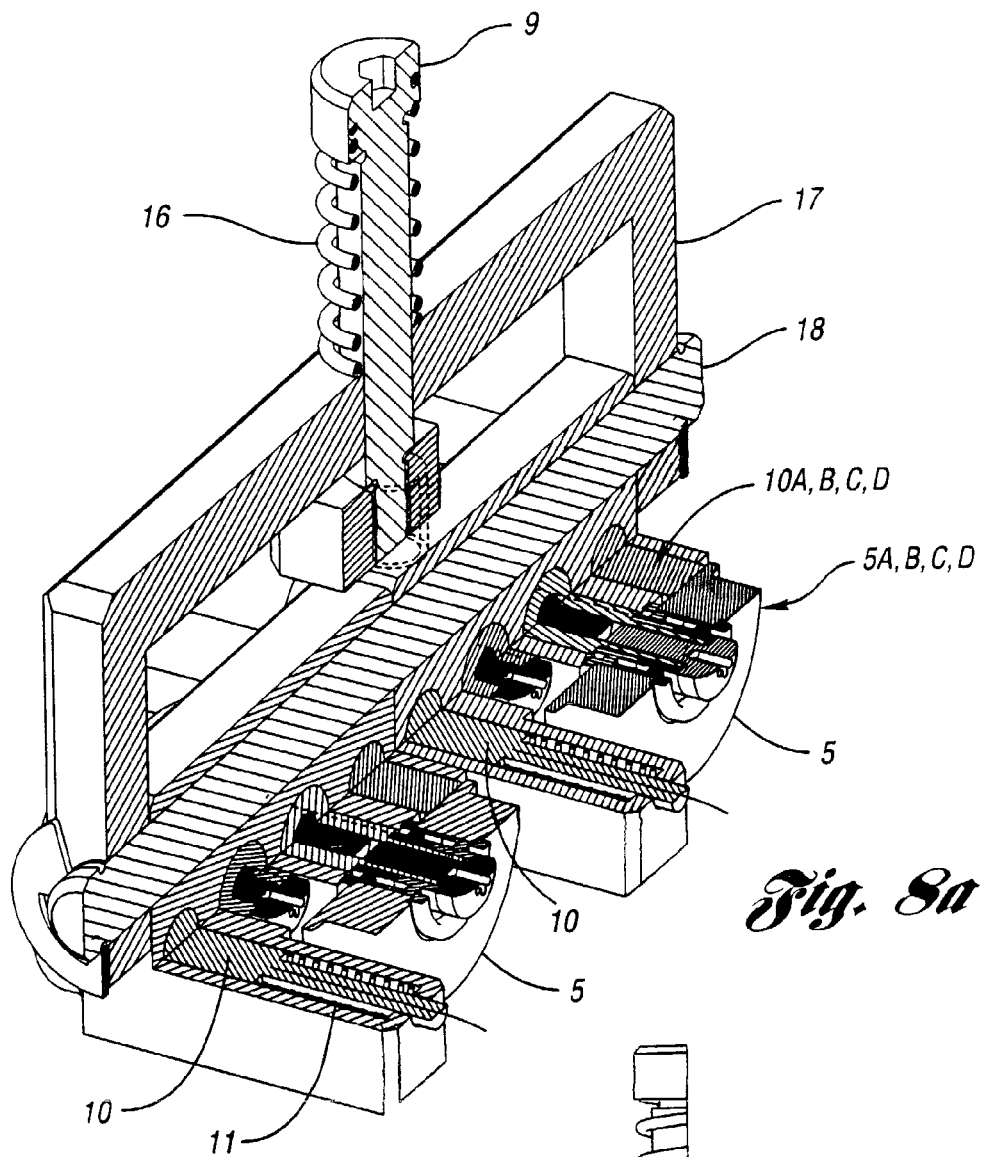
FIGS. 8a and 8b are side and cross-sectional views, respectively, of a brush and wheel mechanism for power distribution to a robotic device in an automated tape cartridge library that may be used with the present invention.
Figure 8B:
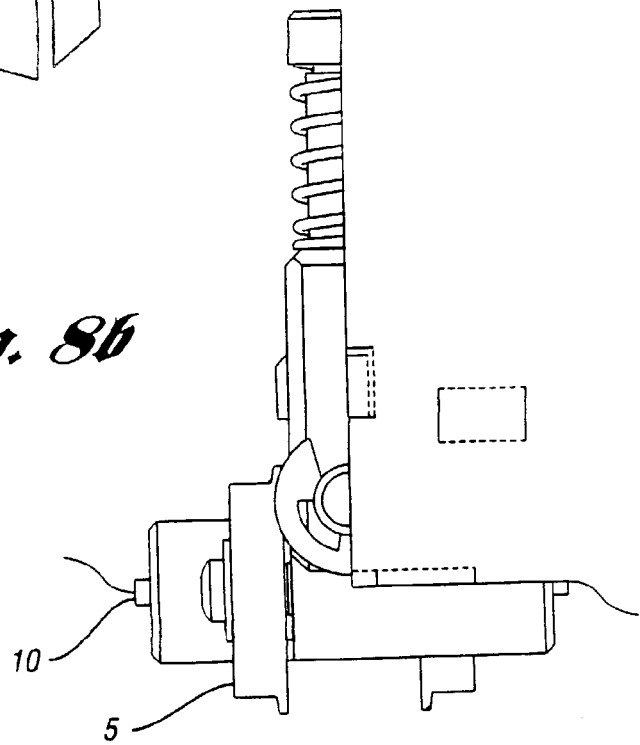
Figure 11A:
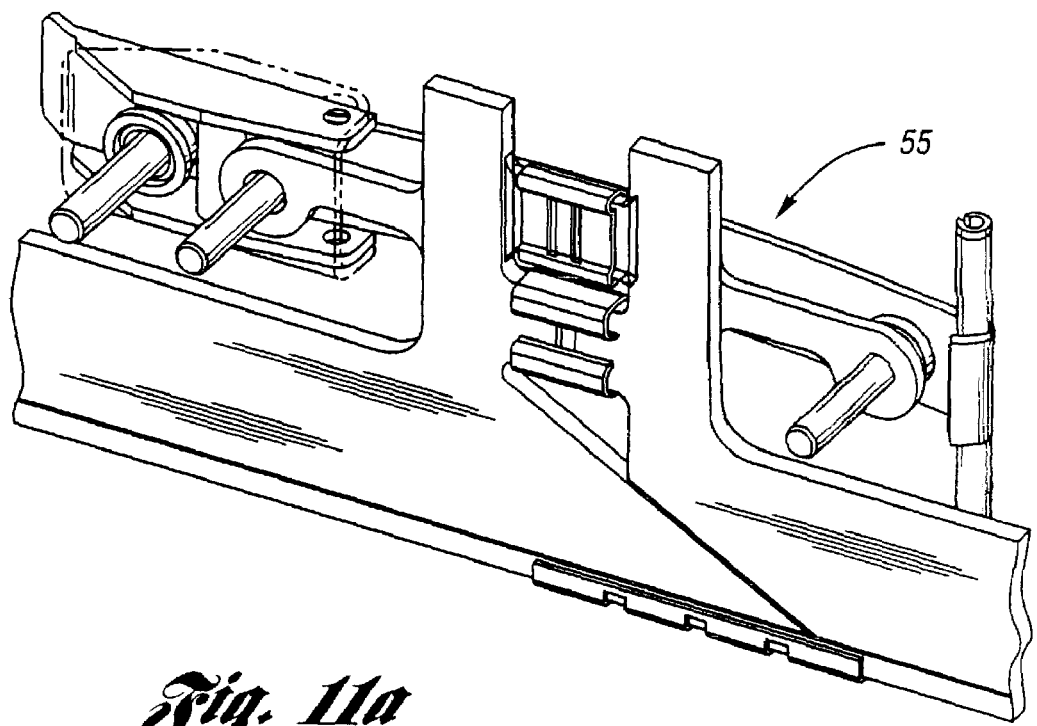
FIGS. 11a and 11b are additional perspective views of a power strip joint for use in an automated tape cartridge library that may be used with the present invention.
Figure 11B:
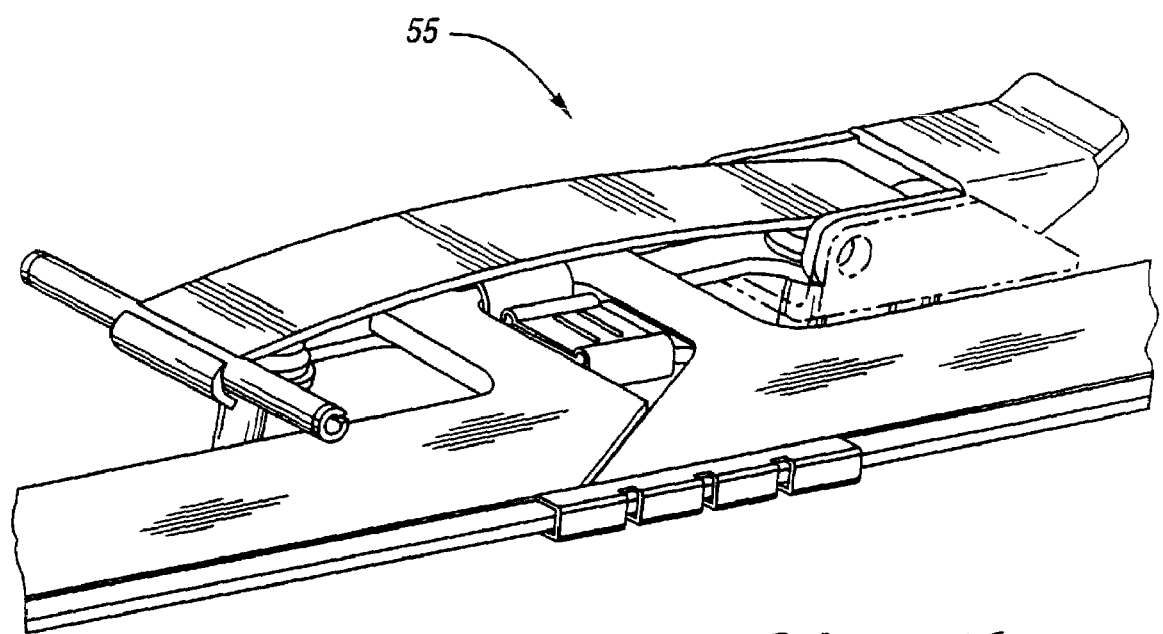
Figure 12A:
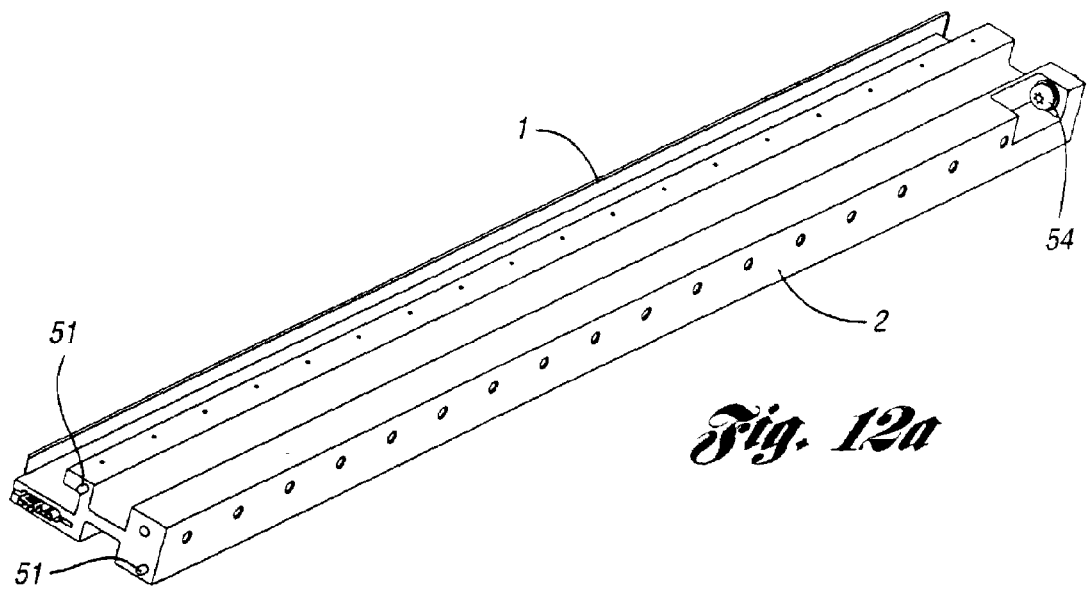
FIGS. 12a and 12b are perspective views of guide rail sections for use in an automated tape cartridge library having brush and strip power distribution.
Figure 12B:
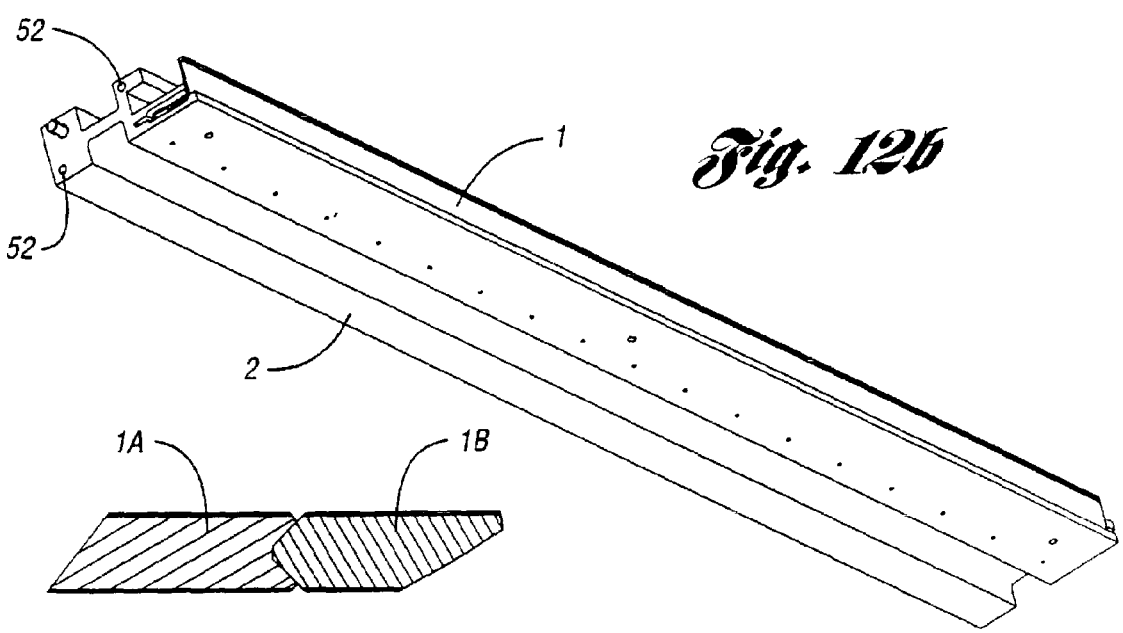
Figure 12C:
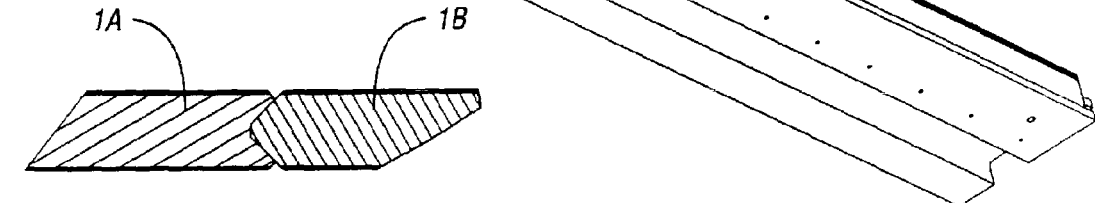
Figure 12B:
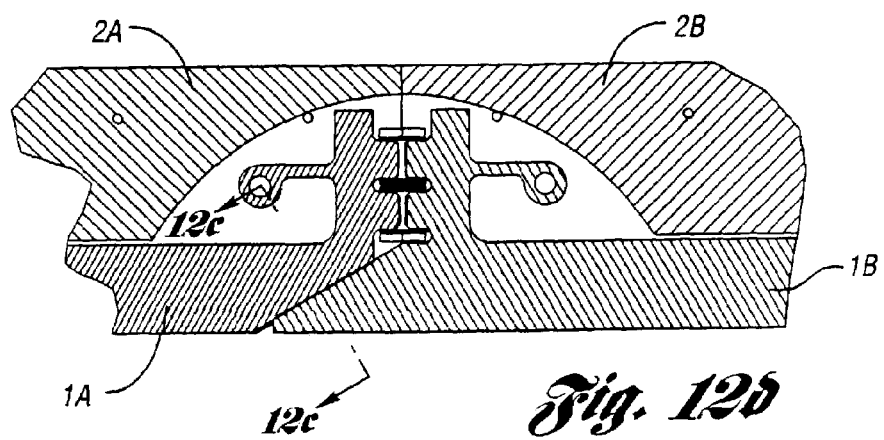

FIGS. 4a and 4b are simplified overhead block diagrams of a power strip (1) and robotic device (20) with conductive brushes (6) for use in an automated tape cartridge libraries according to the present invention. As seen in FIG. 4a, power strips (1) may be fed power from both ends thereof, or multiple sections of power strips may be fed from both ends. Robotic device (20) is preferably provided with multiple pairs of cooperating brush contacts (6), only the top brushes in each cooperating pair being visible in FIG. 4a. In that regard, with reference again to FIGS. 2a and 2b, it should also be noted that brush pairs on each side of power strip (1) are oriented so as to follow the same path. That is, a pair of brushes (6) contacting the same conductive surface (1A, 1B) are aligned so that both such brushes (6) contact the same part of the conductive surface (1A, 1B) as robotic device (20) moves in the library. Such a brush orientation facilitates the creation of a beneficial oxide layer on the conductive surfaces (1A, 1B). As will be discussed in greater detail below, such an oxide layer helps reduce both electrical and sliding resistance between the brushes and the conductive surfaces (1A, 1B).

Referring still to FIGS. 4a and 4b, cooperating brush pairs are preferably spaced apart on robotic device (20). Such spacing, as well as the use of multiple cooperating brush pairs provides for greater robustness and freedom of movement for robotic device (20) in the event of track irregularities, including unevenness or "dead" track sections. In that regard, as seen in FIG. 4a, a non-powered or "dead" section (40) of power strip (1) will not necessarily prevent robotic device (20) from traversing the full extent of the power strip (1). That is, as the robotic device (20) moves across the dead track section (40), one cooperating pair of brushes always maintains contact with a powered track section (42, 44). Similarly, as seen in FIG. 4b, power strip (1) may be fed power from a more centralized region thereof. As a result of the separation of cooperating pairs of brush contacts, robotic device (20) may be able to traverse longer distances than the length of power strip (1) onto and off of non-powered end-of-track sections (46, 48), provided at least one cooperating pair of brushes maintain contact with powered track section (50). Moreover, in such a fashion, non-powered track sections may be provided where a robotic device (20) may be deliberately driven off power strip (1) and thereby powered down for service.

FIGS. 4c and 4d depict simplified electrical schematics of power supply redundancy schemes. As seen in FIG. 4c, in a brush and strip power distribution system, failure of a power supply (150) or a break (152) in the electrical continuity in a power strip (1) will cause a power interruption. Such an electrical discontinuity (152) in turn will result in a loss of power to all of the robotic devices (20i, 20ii, 20iii, 20iv) connected to the conductor. More specifically, such an electrical break (152) will result in the loss of power to those devices (20iii, 20iv) located on the disconnected side (154) of the strip (1). As will be described in greater detail below, a brush a strip power distribution system may be implemented using many interconnected segments or sections to create power strip (1). Each interconnect substantially increases the possibility that power to part or all of the power strip (1) may be interrupted.

The system shown in FIG. 4d provides for connecting two power supplies (150i, 150ii), rather than one, to power strip (1). The two power supplies (150i, 150ii) are positioned at the two ends of power strip (1), and electrically connected to both ends of power strip (1). The power supplies (150i, 150ii) are preferably of the redundant/load sharing type.

When both supplies (150i, 150ii) are active and functioning normally, they share the load created by robotic devices (20i, 20ii, 20iii, 20iv) nearly equally. In the event, however, that one power supply (e.g., 150i) fails, the remaining power supply (e.g., 150ii) automatically begins to source power to all of the devices (20i, 20ii, 20iii, 20iv) connected to the power strip (1). Moreover, in the event of an electrical discontinuity or break (152) in the power strip (1), each power supply (150i, 150ii) will continue to deliver power to the devices (20i, 20ii, 20iii, 20iv) located on that power supply's (150i, 150ii) respective side of the break (152). Alternatively, as shown in dashed line fashion in FIG. 4c, single power supply (150) may be configured to supply power to both ends of power strip (1), thereby ensuring that a break (152) in power strip (1) will not result in loss of power to any of robotic devices (20i, 20ii, 20iii, 20iv). It should be noted that while shown in FIGS. 4c and 4d as electrically connected at the ends of power strip (1), power supplies (150, 150i, 150ii) may alternatively and/or additionally be electrically connected to any other point or points on power strip (1). That is, in a power strip (1) comprising a plurality of electrically interconnected sections or segments, power supplies (150, 150i, 150ii) may be electrically connected to any number of sections anywhere along power strip (1). It should also be noted that the power supply redundancy schemes depicted in FIGS. 4c and 4d are equally suitable for use in the brush and wheel power distribution system described in detail immediately below.

Referring next to FIGS. 5 through 8a and 8b, various perspective, side and cross-sectional views of a robotic device for use in an automated tape cartridge library having brush and wheel power distribution are shown. Robotic device (20) is supported by a guide rail (2), which is provided with a pair of oppositely charged power conductors (3), preferably in the form of copper rails. Power rails (3) supply power to robotic device (20) through power transmission carriage assembly (4). Power supplied to robotic device (20) via power rails (3) and power transmission carriage (4) powers a motor (not shown), which in turn drives belt and gear mechanism (22) to permit robotic device (20) to move back and forth along guide rail (2) via guide wheels (26). In that regard, it should be noted that power rails (3) may provide either AC or DC power to robotic device (20). It should also be noted again that while only a single robotic device (20) is depicted, power rails (3) are preferably suitable, according to any fashion known in the art, to provide power to multiple robotic devices. As described above in connection with the brush and stip power distribution, each robotic device (20) is suitably equipped with a circuit breaker (not shown) in any fashion known in the art in order to isolate the robotic device (20) from the power rails (3) in the event that the robotic device short circuits. In such a manner, the failure of the power rails (3) is prevented.

Power transmission carriage (4) includes multiple cooperating pairs of conduction wheels (5) (preferably copper), the individual members of a cooperating pair provided in contact, respectively, with oppositely charged conductor rails (3). Conductive brushes (10) are provided to contact conduction wheels (5) and are spring loaded (11), preferably independently, to maintain such contact. To maintain contact between conduction wheels (5) and conductor rails (3), power transmission carriage (4) also includes vertical pre-load spring (16). Power transmission carriage (4) still further includes gimbal arm (17) with pivot shaft (18) and pivot screw (9) for carriage compliance. Once again, multiple or redundant conduction wheel (5) and conductive brush (10) pairs are preferably provided, and preferably spring loaded (11) independently, to improve robustness and reliability in the event of a brush failure, momentary loss of contact at one or more wheels due to any track irregularities, including seams or joints therein, or voltage irregularities between adjacent power rails (3). In that same regard, while a single vertical pre-load spring (16) is shown, each conduction wheel (5) could also be independently spring loaded to maintain contact with conductor rails (3), thereby allowing for better negotiation of any track irregularities or imperfections, including joints or seams.

The brush and wheel embodiment can reduce particulate generation which may accompany the brush and power strip embodiment as a result of brushes negotiating imperfectly aligned track joints. Moreover, because of the more contained nature of the contact between a brush and wheel as opposed to between a brush and extended power stip, any such particulate generation can be more easily contained in the brush and wheel embodiment, such as through the use of a container (not shown) surrounding the brush and wheel to capture any particulate. The brush and wheel embodiment also provides for improved negotiation of joints by a robotic device as it provides for wheels rolling rather than brushes sliding over a joint. As a result, less strict tolerances are required for joint design and assembly. Moreover, a brush passing over an irregularity in a power strip, such as a joint, scrapes both the brush and the track, causing wear to both. A wheel can more easily negotiate such irregularities, thereby reducing such wear.

The brush and wheel embodiment also provides for reduced electrical and sliding resistance as compared to the brush and stip embodiment. In that regard, a beneficial oxide layer that reduces both electrical and sliding resistance develops more easily and quickly between a brush and wheel contact than between a brush and extended power strip contact, again because of the more contained nature of the contact. That is, for a given linear movement of a robotic device, a brush covers much more of the surface, and much of the same surface of a wheel than it covers on an extended linear conductive strip. This is particularly advantageous in reducing high brush resistance when the robotic device is traveling at low speeds.

The brush and wheel embodiment also generally reduces the spring loading forces required. In that regard, because of irregularities in a conductive strip, such as due to joints or seams, a high spring loading force is required to ensure contact is maintained between a brush and power strip, particularly over time as the brush wears. In contrast, with a brush and wheel, there are no irregularities in the point of contact between the brush and wheel. As a result, the spring force used to maintain contact between the brush and wheel can be reduced, which also reduces the drive force or power necessary to move the robotic device.

Still further, the brush and wheel embodiment also reduces track wear, since the rolling friction between the wheel and track creates less wear than the sliding friction between a brush and power strip. In that regard, the conductive strips in a brush and power strip embodiment must be made sufficiently thick to allow for wear due to brush contact over time. Moreover, as previously noted, spring loading forces for brushes in a brush and power strip embodiment must be sufficiently high to ensure contact is maintained between the brush and power strip over time as both wear. A brush and wheel embodiment eliminates these concerns and allows for the use of a more inexpensive track having less stringent design and assembly tolerances.

In either of the brush and power strip or brush and wheel embodiments, the power strip or conduction rails may be oriented horizontally, as shown in the Figures, or vertically, or in a combination of both. Indeed, a vertical track orientation may be preferred, particularly for curved track areas. In that regard, for example, an extended printed circuit board power strip of the type previously described can be easily bent to follow a curved track area if such a power strip is provided with a vertical orientation. In contrast, to follow a curved track with a such a power strip oriented horizontally, a curved printed circuit board may need to be specially manufactured. Moreover, as the radius of curvature of a curved track area decreases, skidding and wear of wheels increases on a horizontally oriented track. This can be alleviated by a vertically oriented track.

For any electrical pickup configuration, the conductors or strips may be provided in segments or sections that can be electrically connected together in a modular fashion, thereby extending the power conductors or strip substantially throughout a data storage library. Such sections may be joined together along the path or a guide rail on which a robotic device moves in the library. In that regard, it should be noted that in either embodiment, the segments or sections of power conductors or strips may be connected in an end to end fashion to provide for robotic device movement in a single dimension, or may be connected in a grid-like fashion to provide for robotic device movement in two dimensions and/or to provide power across multiple horizontal paths for robotic devices, which paths may be stacked vertically on top of each other, thereby providing for robotic device access to multiple media cartridge storage cells arranged in a two dimensional configuration of multiple rows and columns, such as a planar "wall" or "floor," or a curved or substantially cylindrical "wall." Still further, again in either embodiment, the segments or sections of power conductors or strips may be connected in such a fashion as to provide for robotic device movement in three dimensions.

When used in such fashions for power distribution, segmented power strips will be sensitive to alignment so as not to create a sloppy joint. A mis-aligned joint in the power strip may cause a brush to lose contact with a power strip due to bounce. Wear on the brushes and power strip pieces at the joints may also cause limited life of the joint.

As a result, a joint for such power strips may be preloaded and overconstrained to cause the power strips in the robot guide rail to substantially align. Such a joint preferably includes conductors slightly longer than the supporting structure of the robot guide rail, so as to force adjoining conductors into contact at their ends as guide rails and conductors are assembled. In addition, adjoining ends of conductors may be beveled or angled such that a force urging the conductors together causes the conductors to slip laterally against each other, so as to again facilitate alignment at the joint. Such a bevel or angle also spreads out the wiping action of a brush as it traverses the joint, thereby prolonging the life of the joint and brush, and limiting any problems that may arise as a result of any small offset. Still further, the power strips may be pre-loaded or biased by a spring load, thereby causing the joint to stay in compression for the life of the joint.

In that regard, referring next to FIGS. 9 through 12a–g, various perspective, cross-sectional and side views of a power strip and guide rail for use in an automated tape cartridge library are shown. As previously described, power strip sections in a brush and power strip embodiment may be sensitive to alignment. Guide rail sections (2A, 2B) are designed to accept substantially planar, elongated power strip sections (1A, 1B). Power strip sections (1A, 1B) may be of the printed circuit board type previously described, and may include upper (56) and lower (not shown) copper conductive layers on opposite surfaces of an FR4 type substrate material (58). Track alignment pins (51) and holes (52) in guide rail sections (2A, 2B) ensure that guide rails sections (2A, 2B) are properly aligned at the joint, and a joint bolt (54) is provided to ensure sufficient force to maintain the joint. In that regard, an alternative latch mechanism (55) is depicted in FIGS. 11a and 11b to provide sufficient force to maintain the joint.

Power strips (1A, 1B) are preferably beveled or angled (preferably at 30°) in a complimentary fashion at adjoining ends so that such ends will move or slide laterally relative to each other in the X-Y plane during assembly of the joint, thereby accounting for varying tolerances in the lengths of adjoining power strips (1A, 1B) and/or guide rails (2A, 2B). In that same regard, power strips (1A, 1B) are preferably each provided with spring arms (60), which act as means for biasing power strips (1A, 1B) together against such lateral motion. Spring arms (60) preferably include mounting pin holes (62) formed therein, which are designed to align with similar mounting pin holes (64) formed in guide rails (2A, 2B) for receipt of mounting pins (66). Such a configuration facilitates the previously described relative lateral motion between power strips (1A, 1B) in the X-Y plane during assembly, and helps to ensure that power strips (1A, 1B) remain in contact after assembly. A similar spring arm, mounting pin hole and mounting pin arrangement (67) is preferably provided in a central region of each power strip (1) and guide rail (2) section (see FIG. 12e).

Power strips (1A, 1B) are also preferably provided at their adjoining ends complimentary tongue-and-groove like or dove tail type mating edges or surfaces. Such edges, preferably formed with 45° angles, ensure that power strips (1A, 1B) remain co-planer at the joint (i.e., refrain from movement relative to each other in the Z direction) so as not to expose an edge of an upper (56) or lower (not shown) conductive layer. Electrical connection is provided at the joint through the use of quick connect electrical slide type connectors (53A, 53B). In that regard, upper (56) and lower (not shown) conductive layers of adjoining power strips (1A, 1B) each preferably include an electrical connection point. Upon assembly of power strips (1A, 1B), such electrical connection points are proximate each other such that one connector (3A) creates an electrical connection between upper conductive layers (56) of adjoining power strips (1A, 1B), while the other connector (3B) creates an electrical connection between lower conductive layers (not shown) of adjoining power strips (1A, 1B).

In such a fashion, power strips (1A, 1B) are assembled to create a joint where their respective conductive layers are proximate such that a robotic device having brush or wiper type contacts as previously described maintains electrical contact therewith as the robotic device traverses the joint. A well aligned power strip and guide rail joint is thus provided which facilitates easy movement of a brush or wiper contact thereacross, while at the same time accounting for differing manufacturing tolerances and expansion rates between the dissimilar materials used in the power strips (1) and guide rails (2). It should also be noted that while depicted in the figures in conjunction with printed circuit type power strips (1), such features may be used with any type of power strip (1) previously described, or with any other type of joint for power conductors, such as a single conductive strip or bus bar. Indeed, many of the above features may also be used with any type of joint, such as between guide rails without power.

As is well known in the art, robotic devices in an automated tape cartridge library must be able to communicate with a host controller. This is typically done using multiple conductors (three or more) including power, ground, and signal(s), which can cause many of the same cabling problems previously described. The relatively high cost and low reliability of conductors and connectors pose a problem for implementing high reliability, low cost automated robotic data storage libraries. Such a problem is particularly troublesome if the space available for routing such conductors is limited.

Such problems can be overcome by using the oppositely charged conductive layers of a power strip, power rails, or a cable pair to supply not only power to the robotic devices, but communication signals between the robotic devices and a host controller as well. In that regard, in a brush and power strip embodiment, multiple conductors are particularly problematic when power and communication signals need to be sent to robotic devices via the power strip and brushes. Since the reliability of the electrical connections in such an embodiment is inherently relatively low, a substantial reliability and complexity penalty may be incurred when multiple conductors are used.

According to the present invention, a smaller, lower cost and higher reliability system is made possible by eliminating all conductors except those absolutely needed: power and ground. Information which would otherwise be communicated via dedicated signal conductors is instead modulated onto the power conductor. In such a fashion, the communication signals share the same conductor that is used to power the robotic device. Modulator circuits on a host controller and the robotic devices encode the data from the eliminated conductors and impress a modulated signal onto the power conductor. Demodulator circuits on both ends receive and recover the communication signals, translating the data back into its original form. High-speed full-duplex communication is thus implemented without the need for more than two conductors connecting the host controller and the remote robotic devices.

Figure 13:
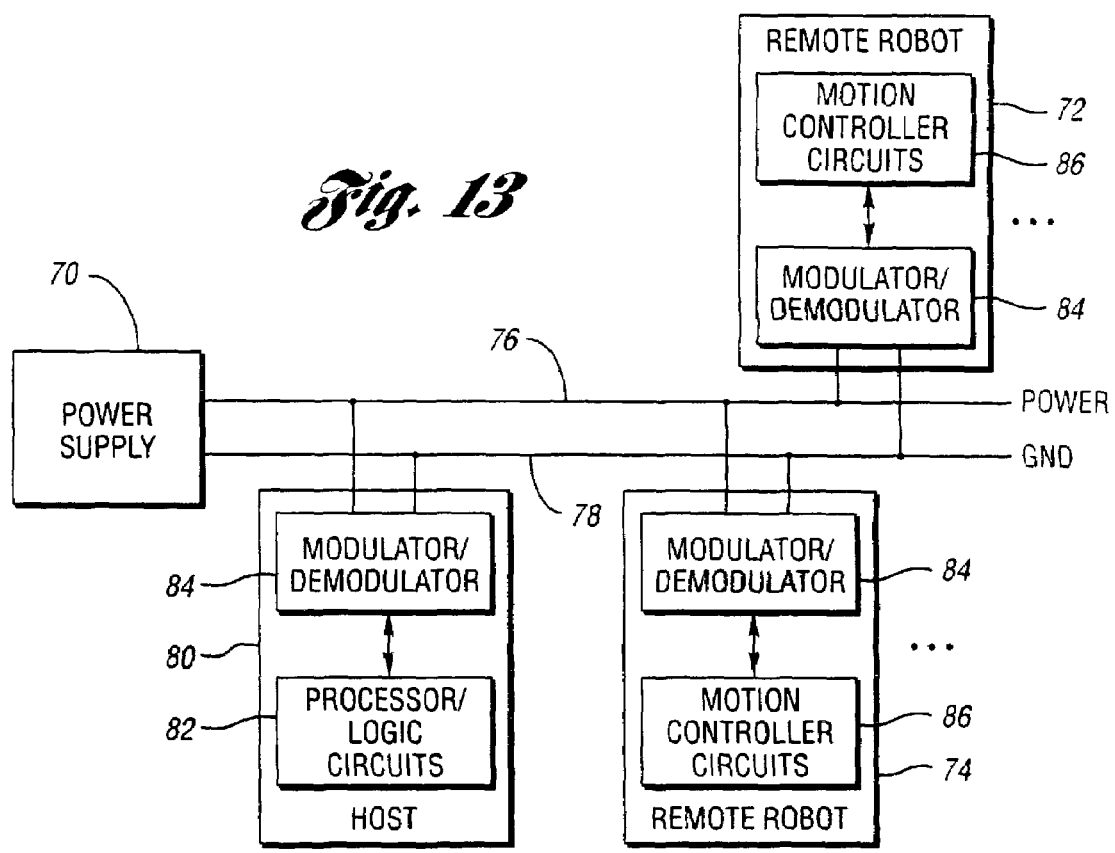
FIG. 13 is a simplified block diagram illustrating distribution of communication signals to and from robotic devices for use in an automated tape cartridge library according to an embodiment of the present invention.

Referring now to FIG. 13, a simplified block diagram illustrating distribution of communication signals to and from robotic devices (72, 74) for use in an automated tape cartridge library is shown. As seen therein, a power supply (70) provides power to robotic devices (72, 74) via power and ground conductors (76, 78), which are preferably the oppositely charged conductive layers of a power strip as described in detail above. A host controller (80), using processor and logic circuits (82), generates signals for use in controlling the movement and operations of robotic devices (72, 74). Host controller (80) is also provided with modulator/demodulator circuitry (84) to encode such communication signals and impress or superimpose such signals onto the power signal provided to the robotic devices (72, 74) via the power conductors (76, 78). Similar modulator/demodulator circuitry (84) is provided onboard robotic devices (72, 74) to recover and decode the signals from host controller (80). Once recovered and decoded, such signals are transmitted to motion controller circuitry (86) onboard robotic devices (72, 74) in order to effect the desired movement and operation of the robotic devices (72, 74).

Robotic devices (72, 74) communicate with host controller (80) in the same fashion, thereby providing feedback to the host controller (80) concerning movement and operation of the robotic devices (72, 74), which information the host controller (80) may use to generate further control signals. In that regard, such communication signals may be combined with the power signal in any fashion known in the art. For example, because power signals are typically lower frequency signals, communication signals may comprise higher frequency signals so that the power signal may be filtered out by robotic devices (72, 74) and host controller (80) using high-pass filters to thereby recover the communication signals. In such a fashion, high-speed full duplex communication may be implemented between the host controller (80) and robotic devices (72, 74) without the need for multiple conductors, cabling, or wireless connection.

Electromagnetic interference and unintended signal emissions can be a problem when transmitting communication signals between robotic devices and a host controller using the oppositely charged conductive layers of a power strip as described above. This can be particularly true for power conductors that are quite long. Interference from radio, television, and other radio frequency (RF) electromagnetic radiation sources, whether or not intentionally emitted, can interfere with the communication signals modulated onto the power conductors. Such interference can cause data transmission errors and slow the maximum attainable rate of data transfer.

In that same regard, when communication signals are modulated onto a long power conductor, some of the RF energy can radiate through the air and interfere with nearby independent power conductors. If the nearby power conductors also contain modulated communication signals, harmful interference can result. The energy radiated by the modulated power conductors may also cause interference in radio and television broadcast bands, or other restricted RF bands. Such interference may be prohibited by government regulations.

According to the present invention, the electromagnetic compatibility (EMC) of the brush and power strip embodiment of the present invention is improved by the orientation of the power strip conductors. As will be described in greater detail below, positive and negative (ground) conductors are preferably separated by a thin layer of insulating dielectric. The positive conductor is preferably centered over the negative conductor. The negative conductor is preferably made wider than the positive conductor in order to minimize fringing of the electric filed due to the modulated communication signal. The thin dielectric minimizes the "loop area" of the conductors. The conductors themselves are flat and relatively thin in order to reduce their respective surface areas, thereby reducing "skin effect." All of the above features serve to improve the EMC of the brush and power strip embodiment.

Figure 14:
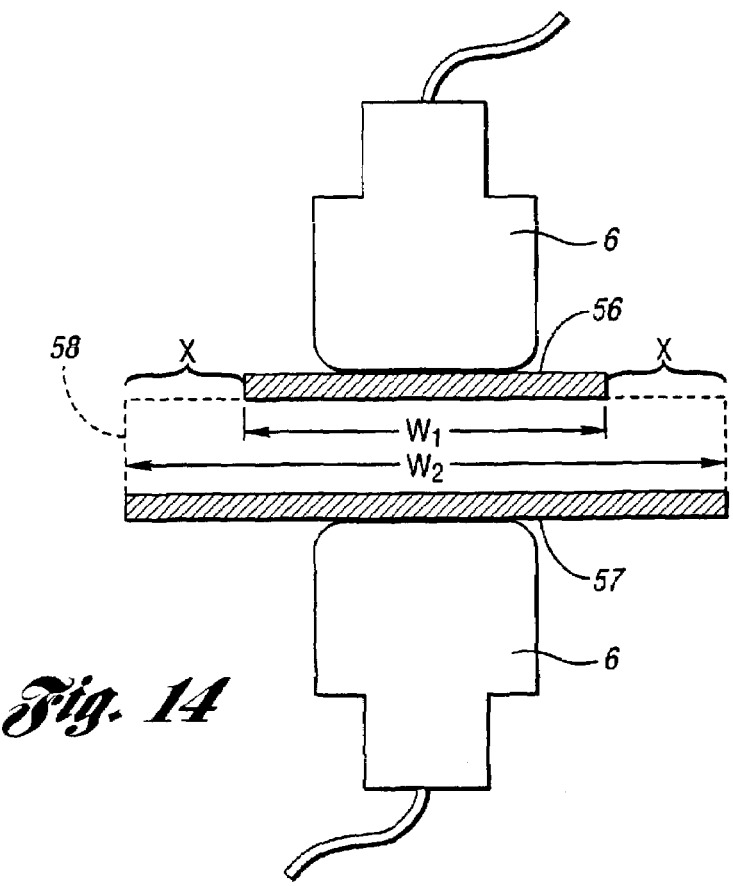
FIG. 14 is a cross-sectional view of a power strip and conductive brushes for use in an automated tape cartridge library.
Figure 15:
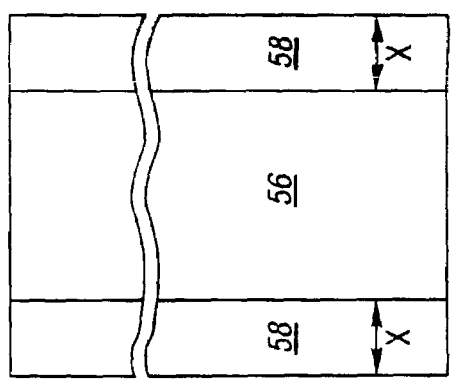
FIG. 15 is a top view of a power strip for use in an automated tape cartridge library.

Referring next to FIGS. 14 and 15, cross-sectional and top views of the power strip for use in an automated tape cartridge library are shown. As seen therein, one conductive layer (56), which is shown in the figures as positively charged or a power conductor, is preferably provided with a narrower width, $w_1$, than the width, $w_2$, of the other conductive layer (57), which is shown in the figures as negatively charged or a ground conductor. A thin dielectric material (58) is provided between conductive layers (56, 57), and has a width, $w_2$, that is preferably substantially equal to that of conductive layer (57). While not required, conductive layer (56) is preferably centered on the surface of one side of dielectric material (58), at equal distances, x, from the edges of dielectric material (58). In that regard, as previously described, conductive layers (56, 57) are preferably copper. Dielectric material (58) preferably has a low dielectric constant, k, such as FR4 previously described, or Teflon.

The above-described configuration serves to improve the electromagnetic compatibility (EMC) of the power strip. More particularly, the different widths of the conductive layers (56, 57) helps to minimize fringing of the electric field due to the modulated communication signals. In that regard, the greater the distance x can be made, either by narrowing conductive layer (56) or by widening conductive layer (57) and dielectric (58), the greater the beneficial effect on fringing. Conductive layers (56, 57) should, however, maintain sufficient width to allow adequate contact with brushes (6) in order to supply power to a robotic device.

Moreover, as is well known in the art, electrical current is generally forced to the outside surfaces of a conductor, particularly at higher frequencies. Conductors having less surface area therefore have higher resistance, a phenomenon generally referred to as "skin effect." By making conductive layers (56, 57) generally flat and thin, more surface area is created, thereby reducing resistance for the higher frequency communication signals. Such lowered resistance in turn reduced signal loss, thereby allowing for the use of longer tracks, while at the same time improving signal integrity by providing better immunity from interference by other signals.

Figure 16A:
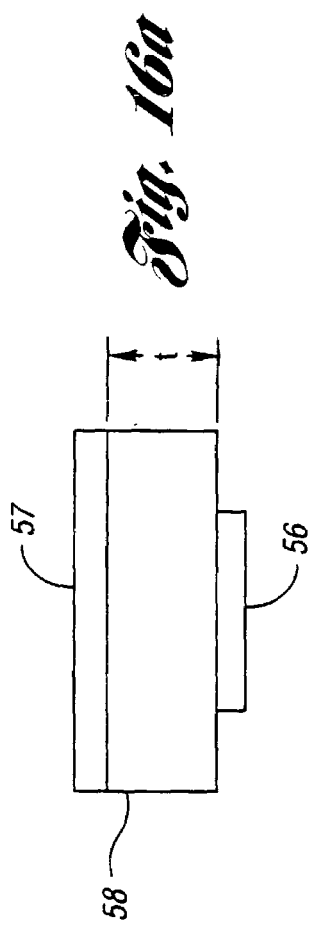
FIGS. 16a and 16b are a cross-sectional view and a simplified electrical schematic, respectively, of a power strip for use in an automated tape cartridge library.
Figure 16B:
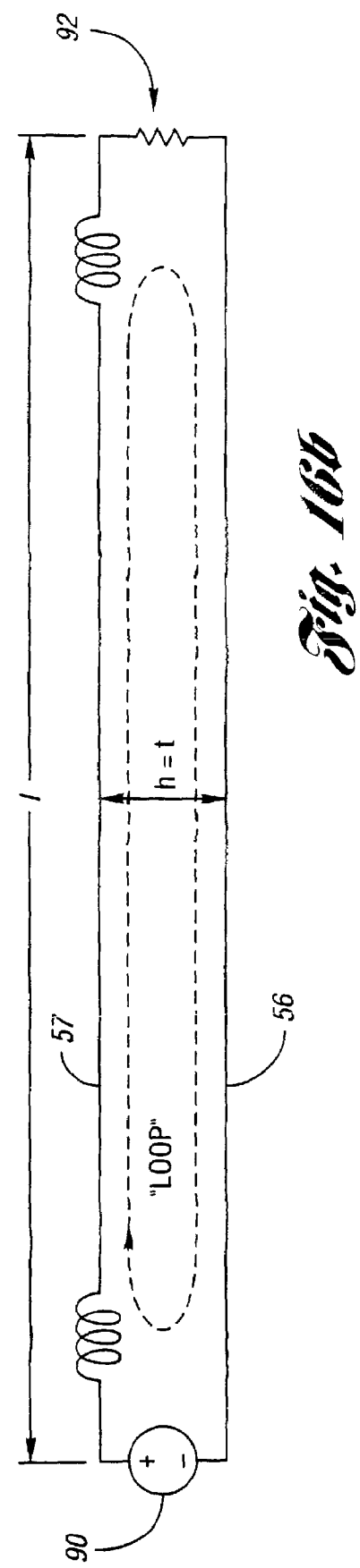

Still further, a thin dielectric (58) helps to minimize the "loop area" of the conductors (56, 57). In that regard, FIGS. 16a and 16b are a cross-sectional view and a simplified electrical schematic, respectively, of the power strip for use in an automated tape cartridge library. As seen therein, conductors (56, 57) are connected through a power supply (90) and a load (92), thereby creating a loop. While the length, l, of conductors (56, 57) is generally fixed, the thickness, t, of the dielectric (58) therebetween may be adjusted. That is, while the length of the loop is generally fixed, its height is adjustable. A thin dielectric (58) thus helps to reduce "loop area."

As previously noted, by minimizing fringing, "skin effect" and "loop area," the above-described configuration improves electromagnetic compatibility (EMC). In general, the above-described power rail presents a low impedance, thereby reducing coupling from interfering signals. In particular, minimizing fringing reduces the possibility that a communication signal on a power rail will interfere with other devices, including other power rails carrying other communication signals. Minimizing "skin eftfect" and "loop area" also reduces the possibility of such radiation type interference.

Figure 17:
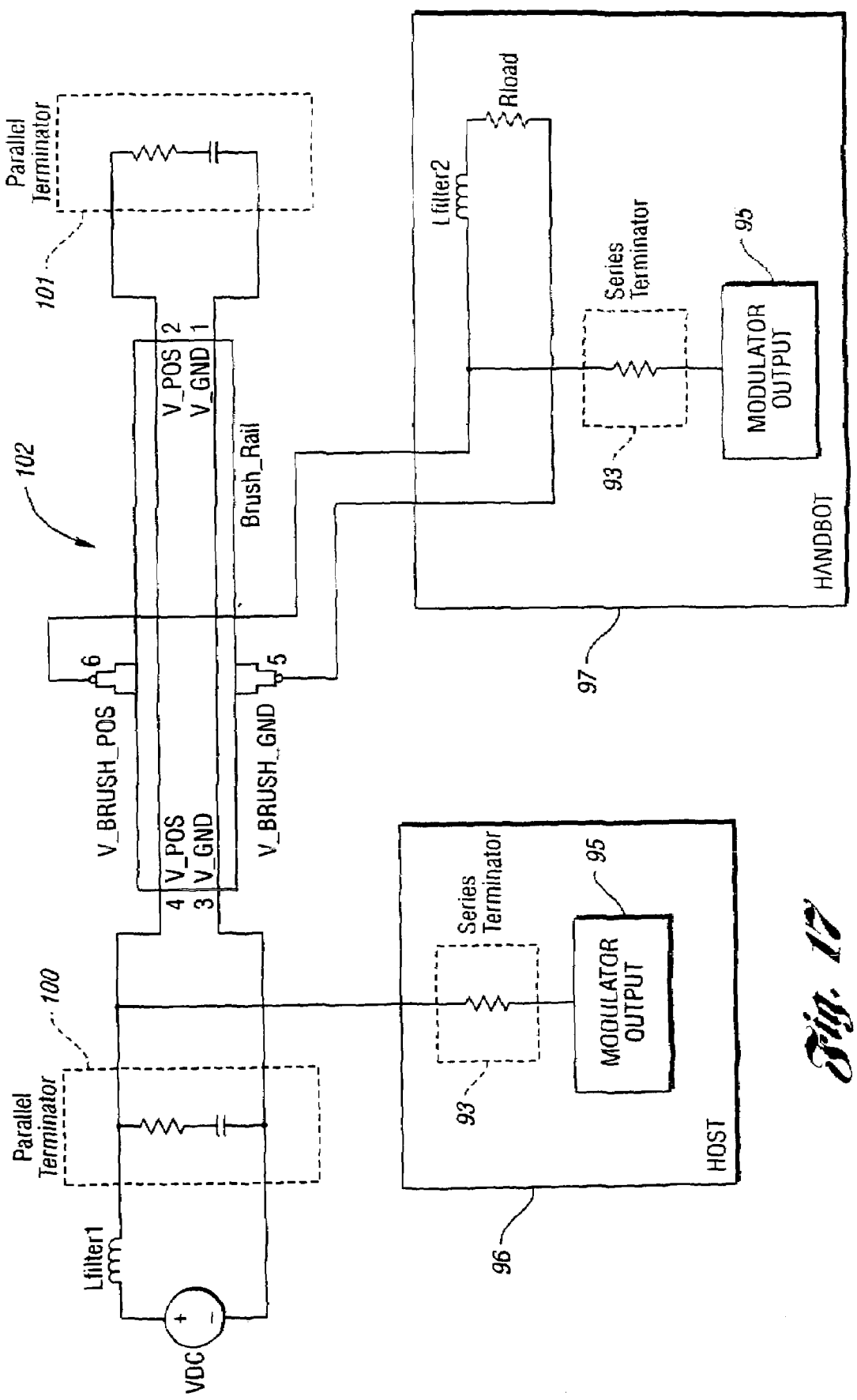
FIG. 17 is a simplified electrical schematic diagram illustrating a termination scheme for a line in a power strip or rail communication system.

In a power line communication system such as described above, signal reflections can pose a significant signal integrity problem. Reflections can destructively interfere with the communication signal, particularly when the length of the power line is long compared to the wavelength of the carrier signal. The reflection problem can be mitigated with the addition of line terminators at the extreme ends of the power line. In that regard, FIG. 17 is a simplified electrical schematic diagram illustrating a termination scheme for a line in a power strip or rail communication system according to the present invention. As seen therein, the termination scheme comprises two parallel terminators (100, 101) at each of the two ends of the power line/rail (102). As shown in FIG. 17, each terminator (100, 101) preferably comprises an RC termination, although those of ordinary skill will appreciate that a variety of termination schemes could be employed to achieve the same effect.

Still referring to FIG. 17, series terminators (93, 94), which are preferably resistors, are also preferably provided on the output of each modulator circuit (95) for both the host controller (96) and the automated robot, or handbot (97). The combination of series termination and parallel termination further enhances the signal integrity of the power line (102). Either series or parallel termination could be used on its own, however. Proper line termination such as that depicted in FIG. 17 dramatically improves signal integrity and increases the maximum attainable rate of data transfer as well as extending the maximum length of the conductors.

Figure 18:
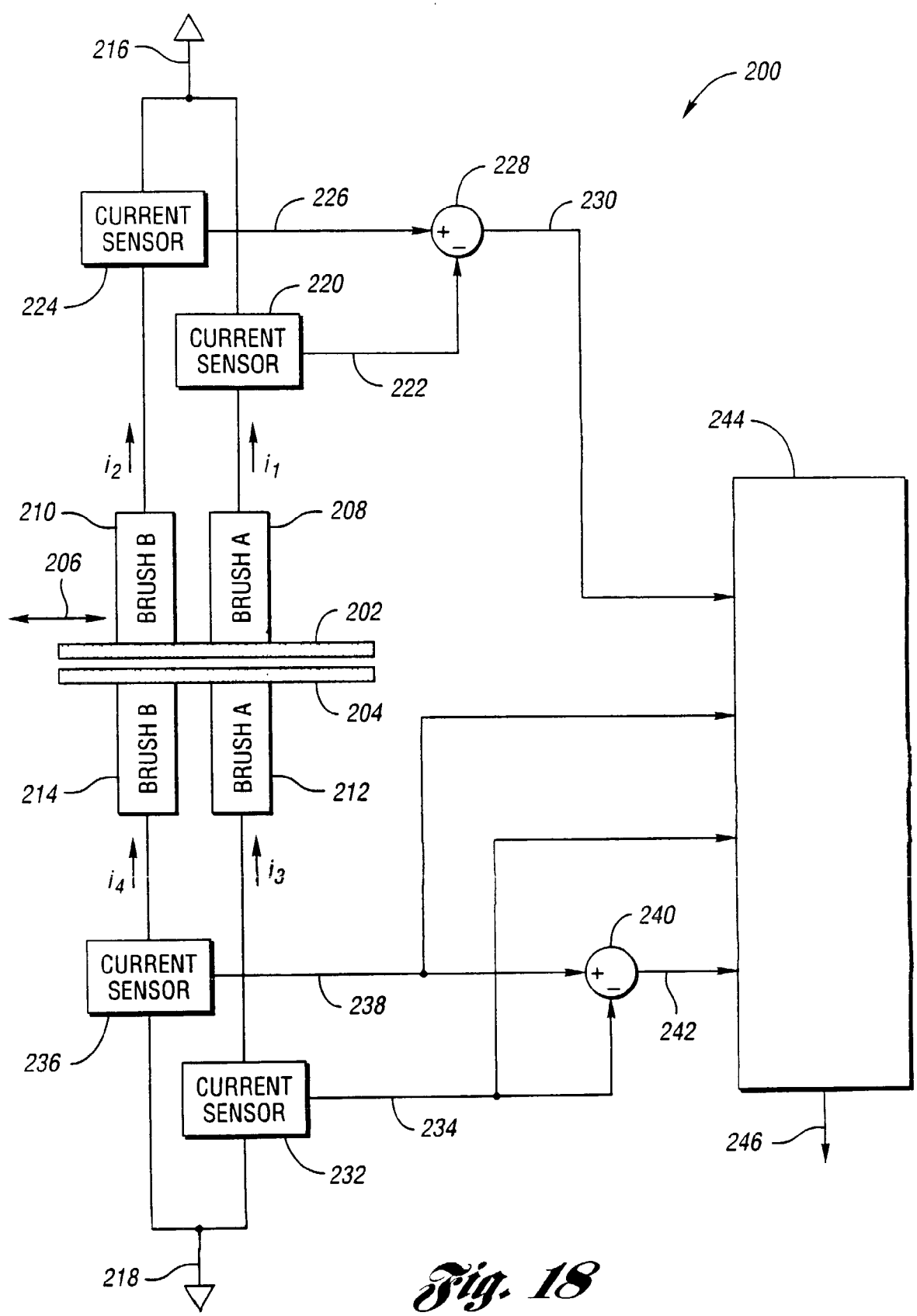
FIG. 18 is a schematic diagram illustrating a system for detecting brush failure.

Referring now to FIG. 18, a schematic diagram illustrating a system for detecting brush failure is shown. A mechanism, shown generally by (200), moves along first conductor (202) and second conductor (204) in a direction indicated by (206). Mechanism (200) may be, for example, robotic device (20) for use in a data storage library. Mechanism (200) draws power for operation from one or both of first conductor (202) and second conductor (204). During normal operation, first brush (208) and second brush (210) conduct currents $i_1$ and $i_2$, respectively, from conductor (202). Similarly, third brush (212) and fourth brush (214) conduct currents $i_3$ and $i_4$, respectively, to conductor (204). Brushes (208, 210, 212, 214) may contact conductors (202, 204) directly or may be members of a pickup assembly containing other elements which directly contact conductors (202, 204). In the embodiment shown, currents $i_1$ and $i_2$ form a parallel path supplying positive supply (216). Likewise, currents $i_3$ and $i_4$ form parallel paths for negative supply (218). Positive supply (216) and negative supply (218) may be, for example, 48 volts and return.

First current sensor (220) detects first current $i_1$ from brush (208) and generates first current signal (222). Similarly, second current sensor (224) senses second current $i_2$ from brush (210) and generates second current signal (226). Third current sensor (232) senses third current $i_3$ from brush (212) and generates third current signal (234). Fourth current sensor (236) senses fourth current $i_4$ through brush (214) and generates fourth current signal (238). Differencer (240) generates negative current difference signal (242) as the difference between third current signal (234) and fourth current signal (238). Circuitry (244) accepts one or more signals indicative of brush operation, such as positive current difference signal (230), negative current difference signal (242), third current signal (234), fourth current signal (238), and the like. Circuitry (244) generates output signal (246) indicative of the operating status of brushes (208, 210, 212 and 214). For example, circuitry (244) may compare one or both difference signals (230, 242) with a threshold. If the threshold is exceeded, circuitry (244) indicates a brush anomaly. If difference signal (230, 242) is signed, circuitry (244) determines the problematic brush based on the sign of difference signal (230, 242). For the example shown in FIG. 18, a negative difference (230) would indicate problems with second brush (210) and a positive difference signal (230) would indicate problems with first brush (208). If difference signal (230, 242) is not signed, examining current signals (238, 234) will indicate which brush (214, 212) is having difficulties. In addition, feeding current signals (238, 234) into circuitry (244) permits circuitry (244) to determine multiple brush failures if the combined current draw is too low.

Figure 19N:
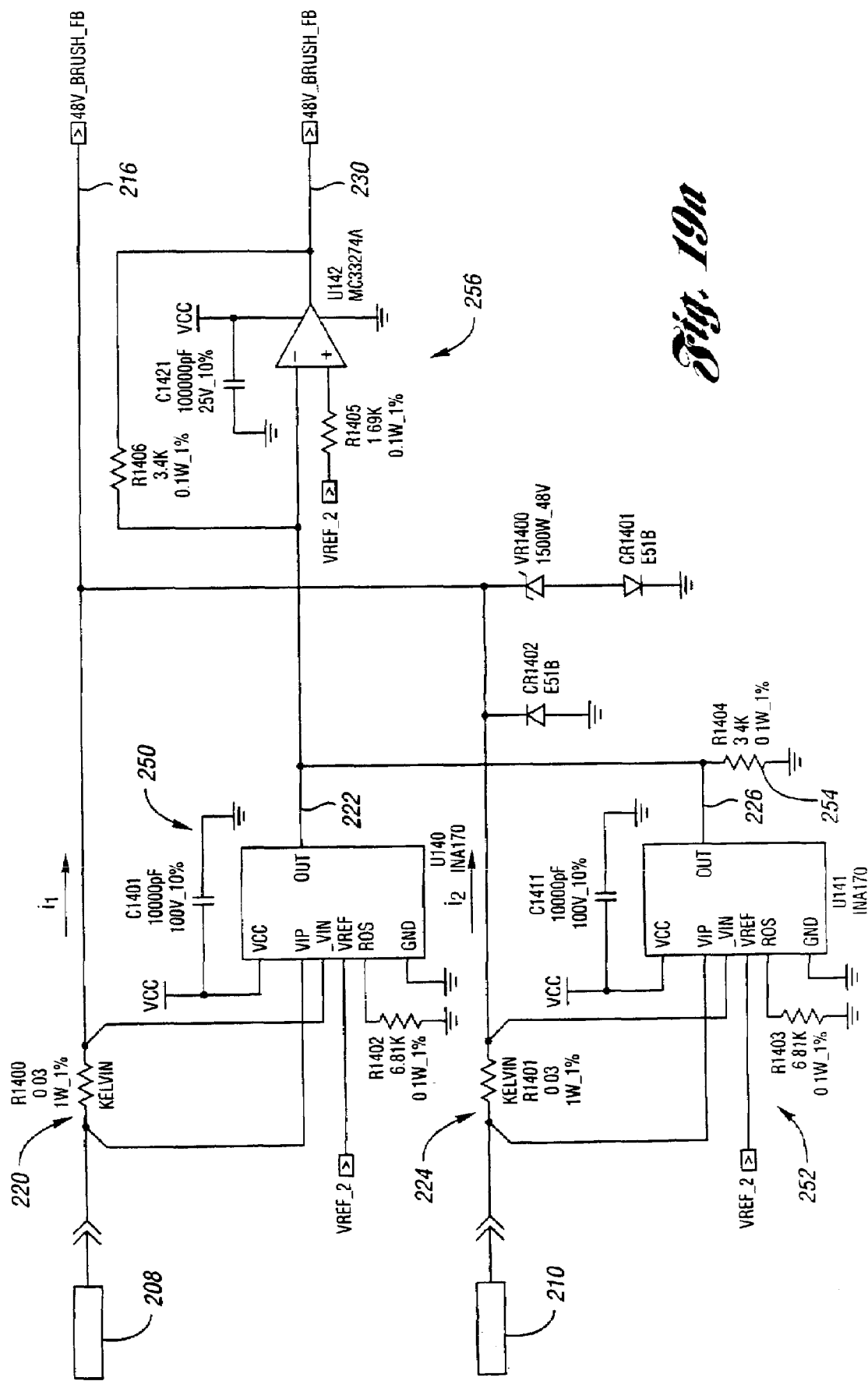
FIGS. 19a–19d are schematic diagrams illustrating circuitry for detecting brush failures or track defects.
Figure 19B:
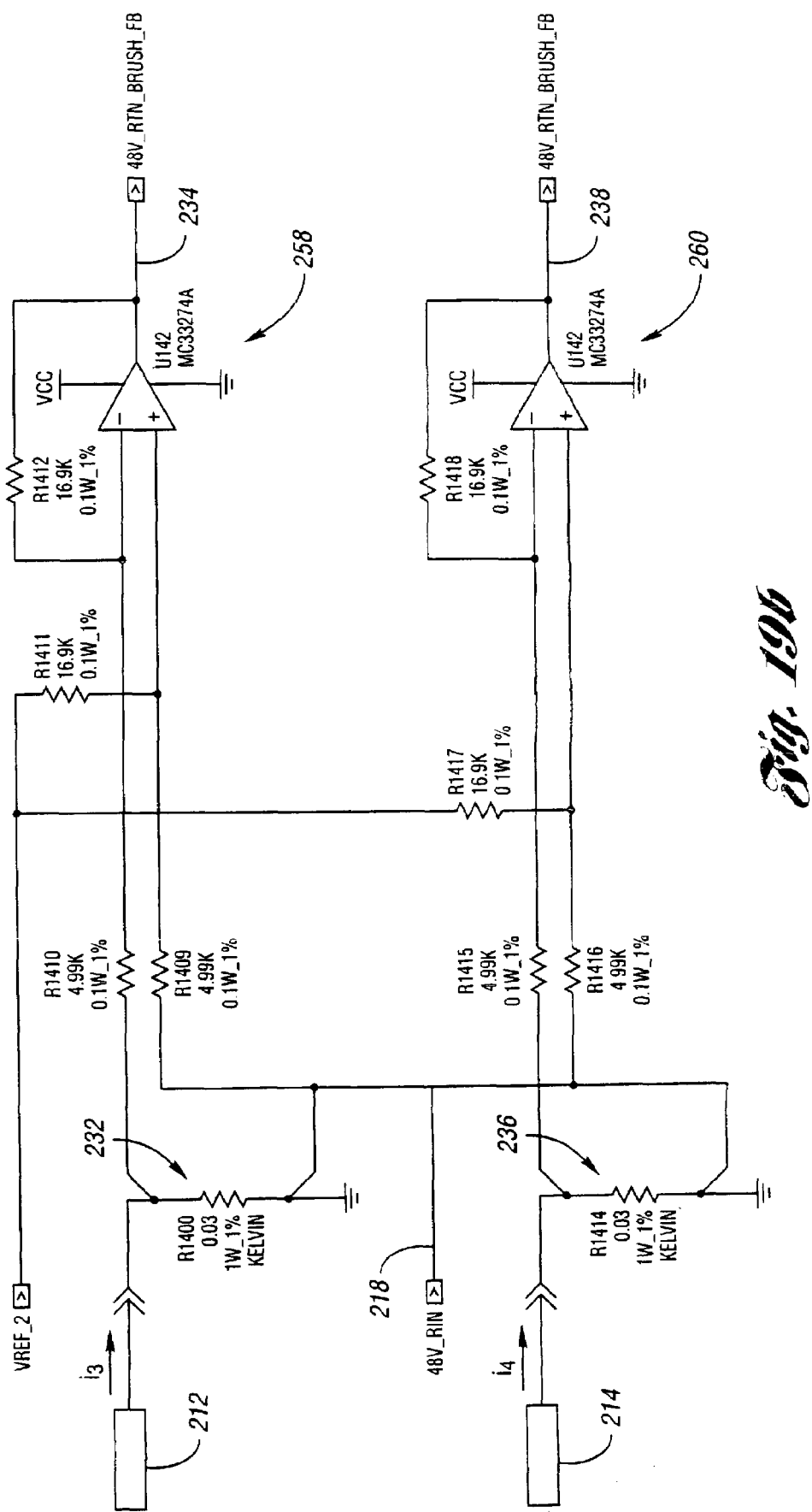

Referring now to FIGS. 19a through 19d, schematic diagrams illustrating circuitry for detecting brush failure are shown. In FIGS. 19a and 19b, each current sensor (220, 224, 232, 236) is implemented using a 0.03Ω, 1W resistor placed in series with the current to be detected. As will be recognized by one of ordinary skill in the art, other current sensors may be utilized in the present invention.

With reference to FIG. 19a, resistor (220) is placed in series with brush (208) to sense current $i_1$. Each side of resistor (220) is tapped by conversion circuit (250) which converts the voltage drop across resistor (220) into a proportional output current as first current signal (222). Similarly, resistor (224) is placed in series with brush (210) to measure second current $i_2$. Conversion circuit (252) measures the voltage drop across resistor (224) and generates a proportional current as second current signal (226). The voltage inputs of conversion circuit (250) are reversed relative to corresponding inputs on conversion circuit (252). Thus, if first current $i_1$ is the same as second circuit $i_2$, first current signal (222) will cancel second current signal (226). If first current $i_1$ is different than second current $i_2$, a proportional difference will appear between first current signal (222) and second current signal (226). This difference current will flow through resistor (254) creating a difference voltage. Buffer circuit (256) buffers this difference voltage to produce positive current difference signal (230, labeled as 48V_BRUSH_FB). Thus, resistor (254) and buffer circuit (256) are functioning as differencer (228).

With reference to FIG. 19b, resistor (232) is placed in series with brush (212) to sense current $i_3$. The voltage drop across resistor (232) is detected by buffer circuit (258) to generate third current signal (234, labeled as 48V_RTN_BRUSHA_FB). Similarly, resistor (236) is placed in series with brush (214) to sense current $i_4$. Buffer circuit (260) senses the voltage drop across resistor (236) and generates fourth current signal (238, labeled as 48V_RTN_BRUSHB_FB).

Figure 19C:
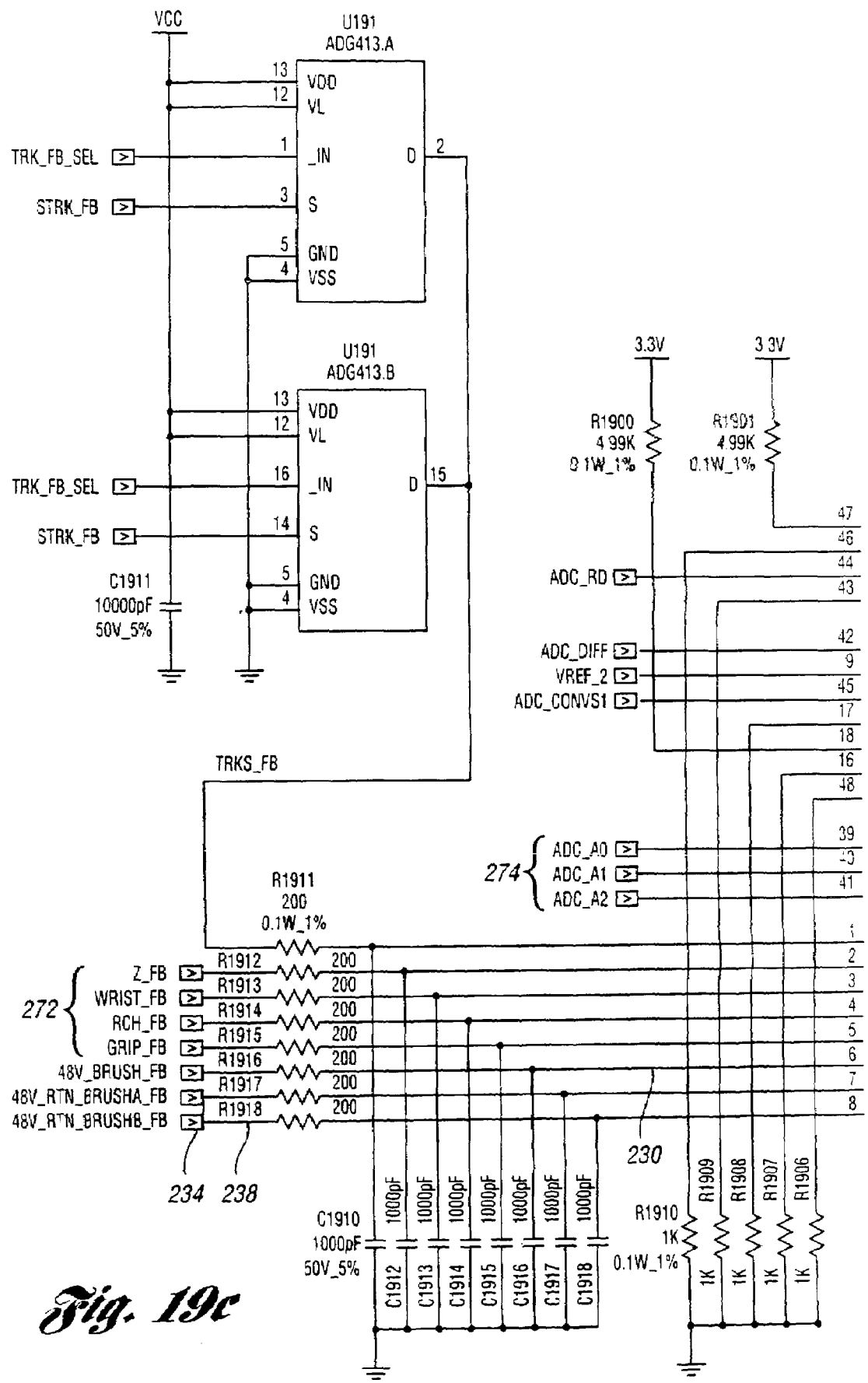
Figure 19B:
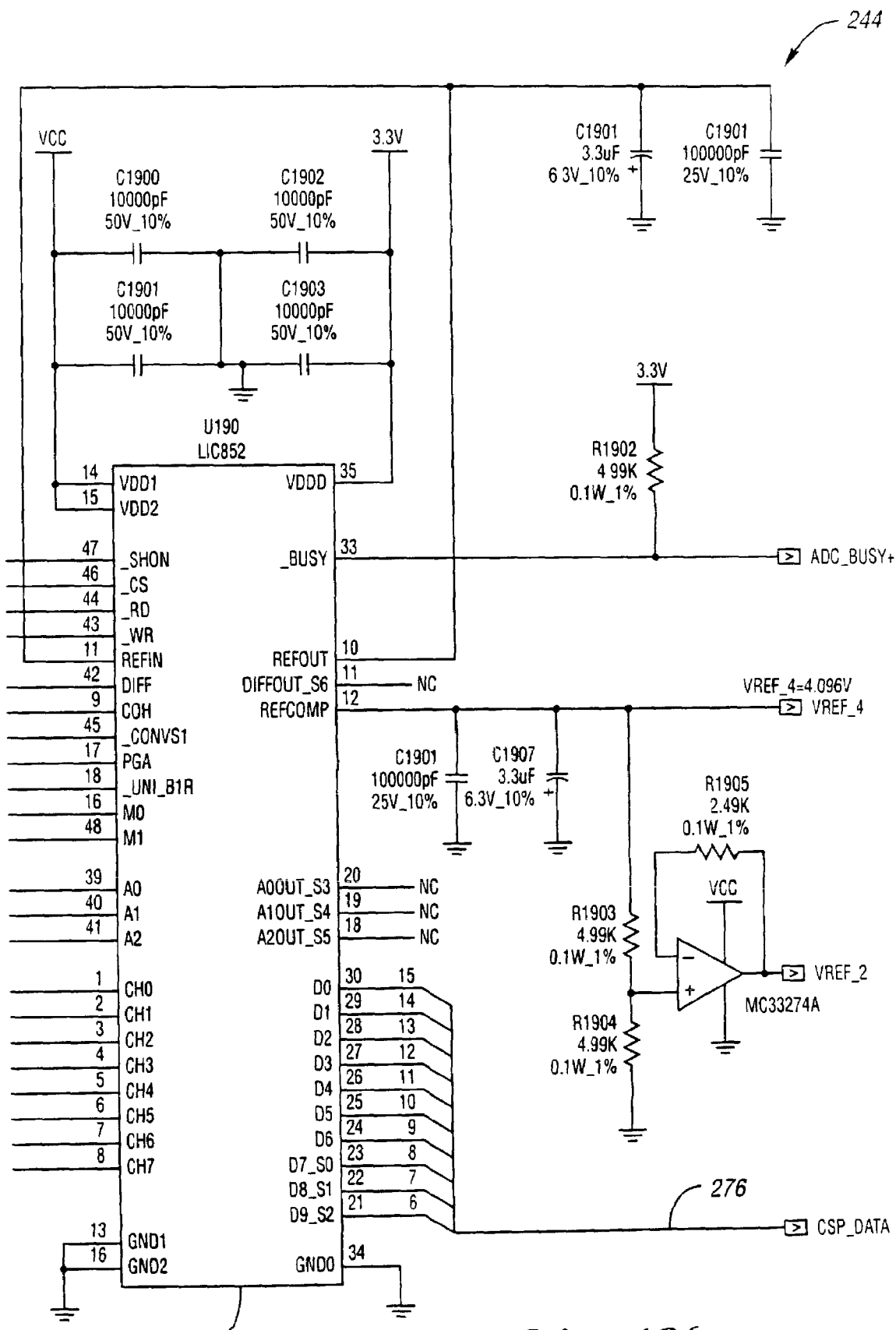

Referring now to FIGS. 19c and 19d, positive current difference signal (230), third current signal (234) and fourth current signal (238) are received by analog-to-digital converter (270). Other analog signals to be converted, indicated by (272), are also received by analog-to-digital converter (270). Select inputs, indicated by (274), determine which input to analog-to-digital converter (270) will be digitized. The digitized value appears on bus (276). Bus (276) is read by a microprocessor, not shown for clarity. This microprocessor carries out the assessment of brush health as described above. In this example, negative current difference signal (242) is calculated by the microprocessor using digitized versions of third current signal (234) and fourth current signal (238).

Figure 20:
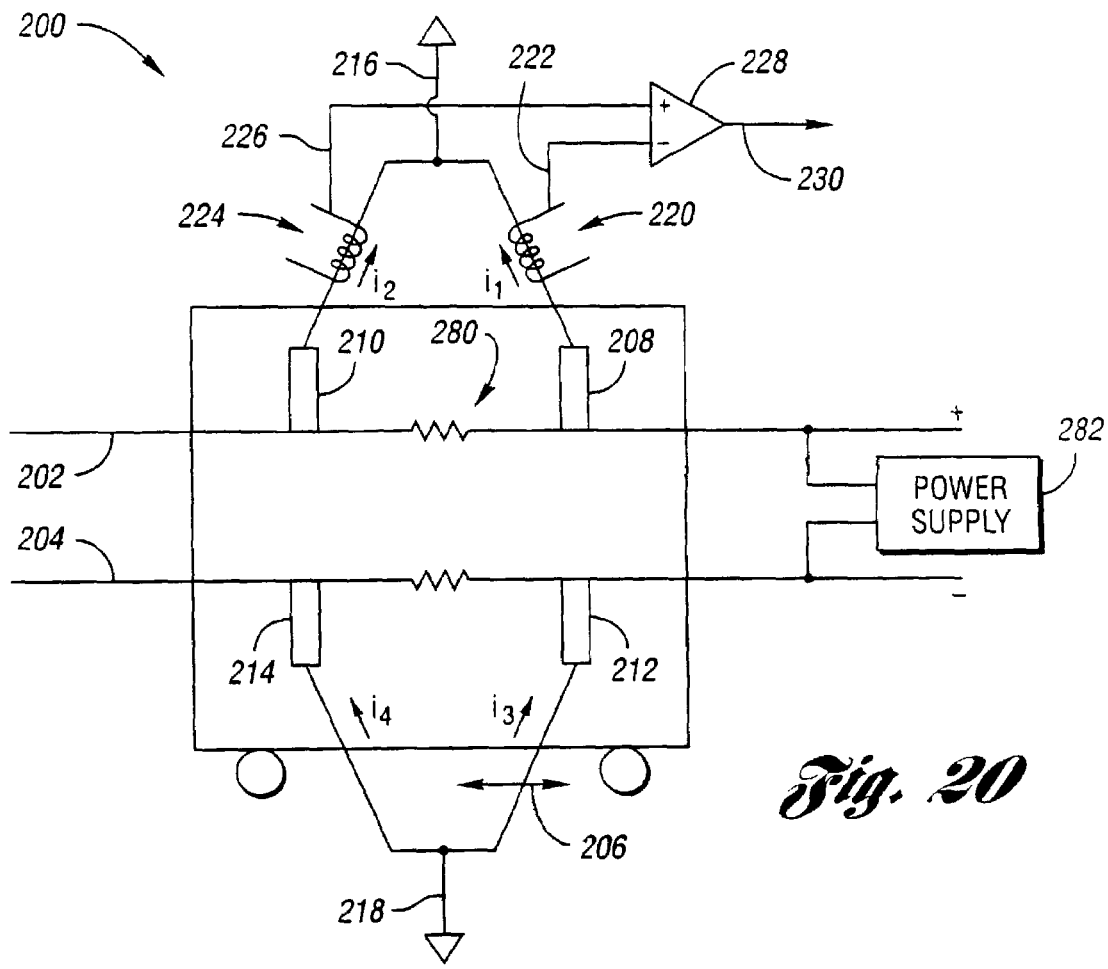
FIG. 20 is a schematic diagram illustrating power strip fault detection through current sensing by the robotic device.

Referring now to FIG. 20, a schematic diagram illustrating power strip fault detection through current sensing by the robotic device is shown. One or more conductors (202, 204) may contain a defect, indicated by (280). Defect (280) may be caused due to joint breakdown, mechanical damage of a conductor, age, wear, and the like. The effect of defect (280) is to degrade the ability of power supply (282) from supplying power along conductors (202, 204). In addition, communications traveling along conductors (202, 204) may be impeded. Defect (280) may appear as an increase in the impedance of conductor (202, 204) including a complete break or infinite impedance at defect (280). Defect (280) can be detected by examining the power drawn from one or both conductors (202, 204) on either side of defect (280).

In the embodiment shown in FIG. 20, power is indicated by measuring current. First current sensor (220) is implemented with a current sensing loop generating first current signal (222). Similarly, second current sensor (224) is implemented with a current sensing loop generating second current signal (226). Differencer (228) generates current difference signal (230) indicative of the difference in power sensed on either side of defect (280).

Figure 21:
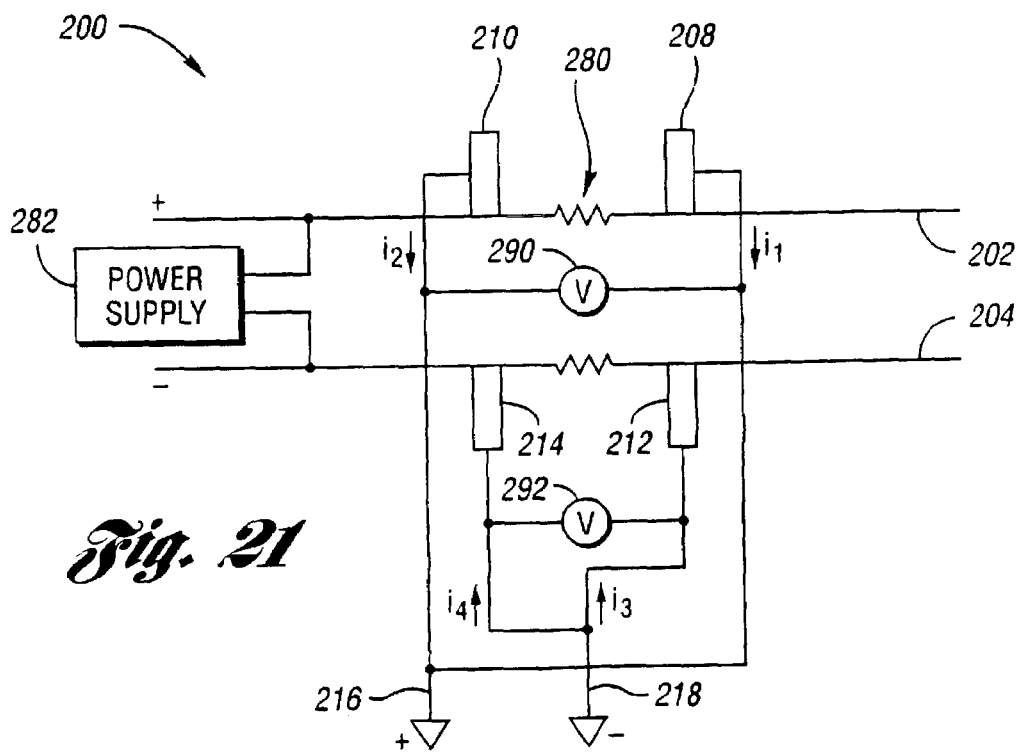
FIG. 21 is a schematic diagram illustrating power strip fault detection through voltage sensing by the robotic device.

Referring now to FIG. 21, a schematic diagram illustrating power strip fault detection through voltage sensing by the robotic device is shown. Voltage sensor (290) is inserted to measure the voltage potential between the path taken by current $i_1$ and the path taken by current $i_2$. Similarly, voltage sensor (292) is inserted to measure the voltage potential between the path for current $i_3$ and the path for current $i_4$. Construction of voltage sensors (90, 92) is well known in the art. Measuring the voltage difference between paths fed by brushes (208, 210) or by brushes (212, 214) provides an indication of the difference in power being supplied through each brush pair.

Figure 22:
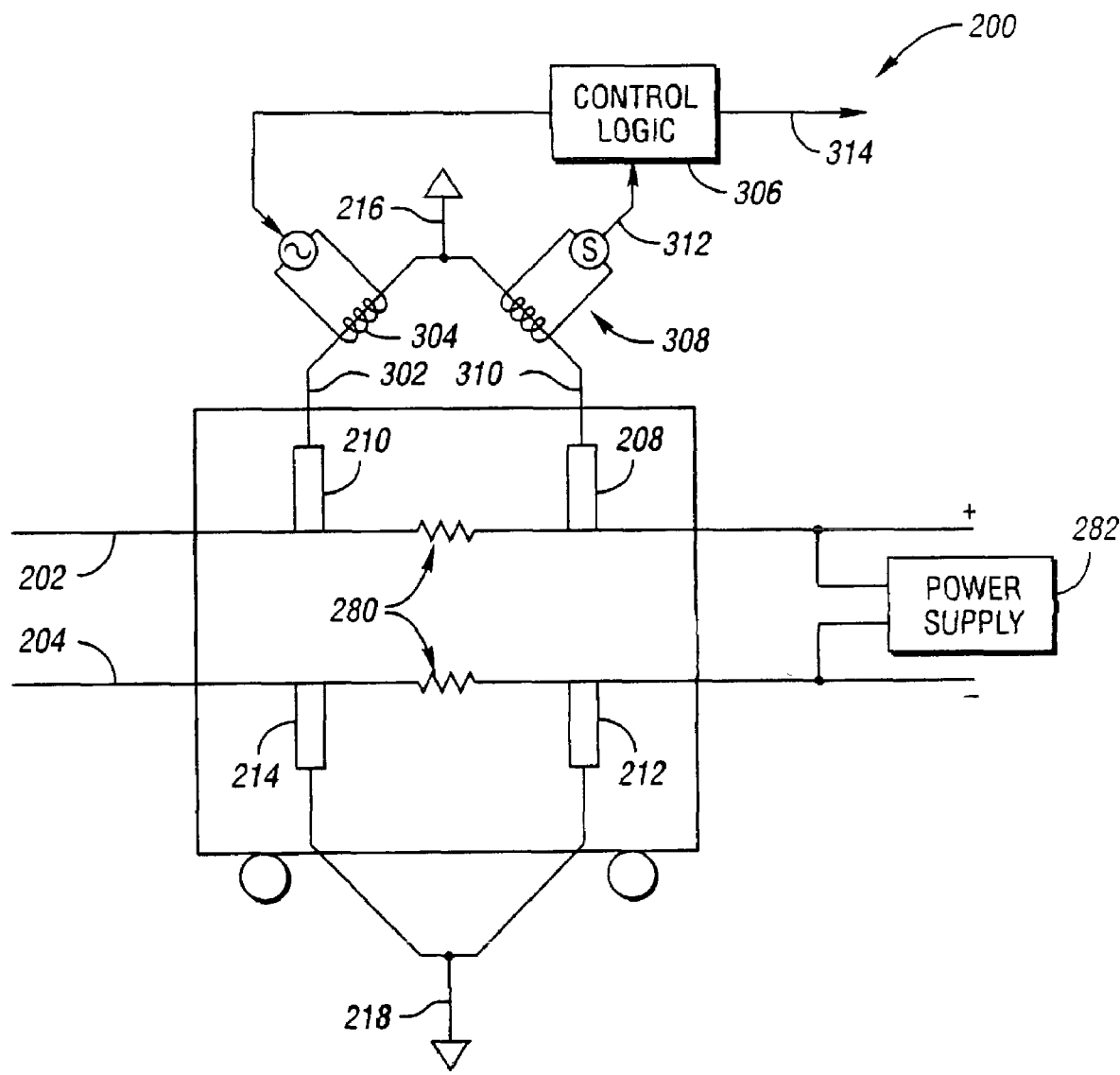
FIG. 22 is a schematic diagram illustrating power strip fault detection through impedance sensing by the robotic device.

Referring now to FIG. 22, a schematic diagram illustrating power strip fault detection through impedance sensing by the robotic device is shown. Defect (280) in one or more conductor (202, 204) may be detected by directly measuring the impedance of conductor (202, 204). The embodiment shown measures the impedance of conductor (202). A similar scheme may be used to measure the impedance of conductor (204). Also, in the embodiment shown, the same brushes (208, 210) used to supply positive supply (216) are used for measuring impedance of conductor (202). Alternatively, a separate set of brushes or other type of pickup may be used.

Signal generator (300) generates a time-varying signal which is sent through brush (210) onto conductor (202). In the embodiment shown, this time-varying signal is induced onto cable (302), connected to brush (210), by coil (304). Preferably, at least one parameter of the time-varying signal is controlled by control logic (306). Controllable parameters include frequency, amplitude, signal type, duration, and the like. The time-varying signal is carried through conductor (202), through brush (208) and is detected by sensor (308) which detects current flowing in cable (310) connected to brush (208). Sensor (308) generates signal (312) indicative of impedance. Control logic (306) generates health signal (314) based on received signal (312).

One method by which control logic (306) determines the presence of anomaly (208) in conductor (202) is by comparing signal (312) to one or more thresholds. For example, if anomaly (280) is a complete break, no signal (312) will be received.

Another means by which control logic (306) can determine the health of conductor (202) is to base the decision on a reference impedance value taken when conductor (202) was fully operational. For example, a reference impedance may be measured following initial checkout. This reference impedance may be stored by control logic (306) or elsewhere. During operation, control logic (306) calls up the reference impedance value and compares the reference impedance against measured impedance to determine the presence of any defect (280). Control logic (314) may also transmit a measured impedance for comparison elsewhere.

It should be noted that any of the techniques described with regard to FIGS. 18–22 may be used for either determining brush health or conductor health. This is due to the fact that a brush condition will appear the same at any position along the track. In contrast, defect (280) in a conductor occurs at a localized position along the track. Thus, any problem which is determined and then disappears as mechanism (200) travels along rail (2) indicates a defect (280). This defect can be confirmed by moving mechanism (200) back over the suspected area. A brush defect, even one that appears intermittently, will not appear in the same manner at a particular geographic location. The circuitry illustrated in FIGS. 19a–19d may be readily adapted to any of the above techniques.

Referring now to FIG. 23, a schematic diagram illustrating track fault detection by impedance measurement is shown. Signal generator (320) generates a test voltage across conductors (202, 204). This test voltage is affected by controller (322) which may control the voltage amplitude, time-varying properties such as signal shape and frequency, duration, and the like. Sensor (324) located away from generator (320) detects the test voltage and generates sensed signal (326) in response thereof. Transmitter (328) sends an indication of sensed signal (126) to controller (322). This transmission may occur over one or both of conductors (202, 204), through cabling (not shown), through a wireless link, or the like. Controller (322) then determines the impedance of conductors (202, 204) based on the voltage sent by generator (320) and the voltage as received by sensor (324).

Mechanism (200) may be used to pinpoint the location of any defect in conductors (202, 204). Sensor (330) receives the test voltage through pickups (332, 334) following conductors (202, 204), respectively. Sensor (330) generates signal (336) indicative of the sensed test voltage. Transmitter (338) transmits a signal based on sensed signal (336) to controller (332) through one or both of pickups (332, 334), through separate cabling, through a wireless link, or the like. In the embodiment shown, switch (340) is connected to transmitter (338) for transmitting through pickup (332) to controller (322). Transmitter (338) also transmits the position of mechanism (200) along conductors (202, 204). In this manner, controller (322) can determine the location of any defect in conductors (202, 204).

Referring now to FIG. 24, a schematic diagram illustrating embodiments of track fault detection by signal transmission is shown. Transmitter (350) transmits a test signal onto one or more conductors (202, 204). This test signal may include a temporary surge in current, a time-varying analog signal, a digital signal, or the like. Receiver (352), located at an opposite end of conductor (202, 204) receives the test signal and responds back to transmitter (350). This response may be sent through one or more of conductors (202, 204), may be sent through separate cabling (not shown), may be sent over a wireless link, or the like. Transmitter (250) then determines the health of conductor (202, 204) based on the received signal. Transmitter (350) may also wait for a timeout period after transmitting a signal onto conductor (202, 204). Transmitter (350) determines an anomaly on conductor (202, 204) if no response is received from receiver (352) within the timeout period.

Mechanism (200) may be used to pinpoint any defect on conductors (202, 204). Receiver (354) traveling down conductor (202, 204) in mechanism (200) receives the test signal through pickup (332). Receiver (354) then transmits back to transmitter (350) through conductor (202, 204), through separate cabling, through a wireless link, or the like.

Figure 25:
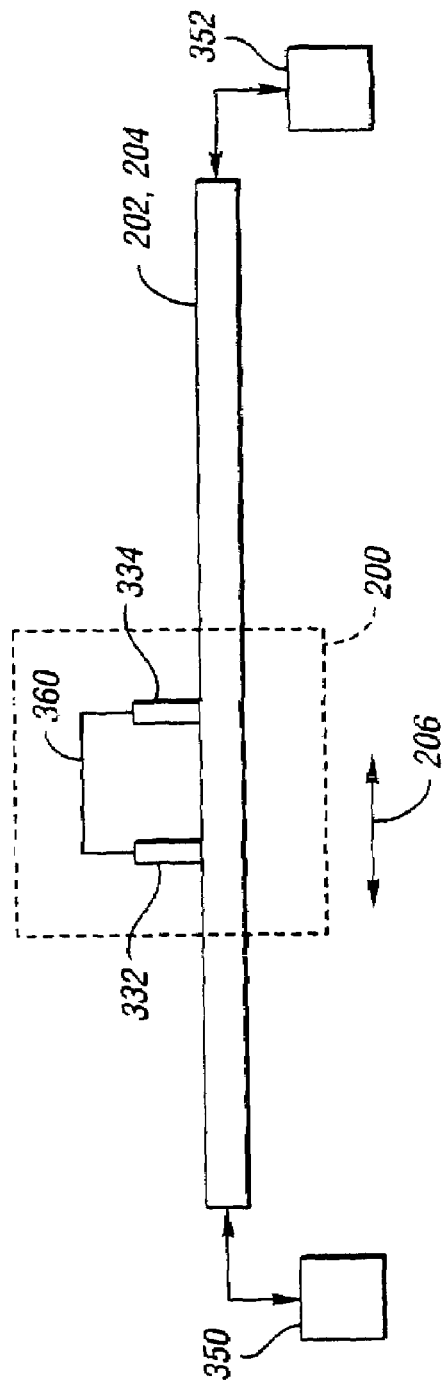
FIG. 25 is a schematic diagram illustrating an alternative embodiment of track fault detection by signal transmission.

Referring now to FIG. 25, a schematic diagram illustrating an alternative embodiment of track fault detection by signal transmission is shown. In this embodiment, mechanism (200) includes pickups (332, 334) interconnected by connection (360). Pickups (332, 334) are spaced apart in direction of travel (206) of mechanism (200) along conductor (202, 204). Thus, when mechanism (200) is over a defect in conductor (202, 204), a path formed by pickup (332), connection (360) and pickup (334) shorts around the defect. This allows a test signal inserted onto conductor (202, 204) by transmitter (350) to be more readily received by receiver (352). When mechanism (200) moves away from the defect, the test signal will be attenuated or not receivable by receiver (352). Transmitter (350), knowing the position of mechanism (200), can determine the location of a defect in conductor (202, 204) based on receiving a transmission from receiver (352).

Figure 26:
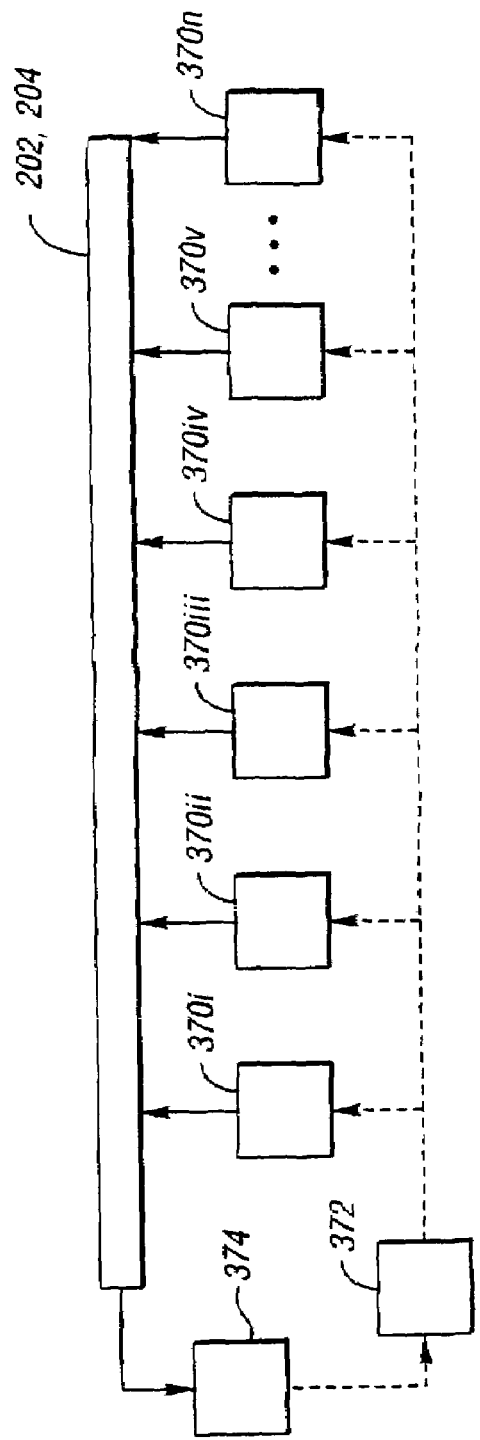
FIG. 26 is a schematic diagram illustrating track fault detection with a plurality of signal transmitters.

Referring now to FIG. 26, a schematic diagram illustrating track fault detection with a plurality of signal transmitters is shown. A plurality of transmitters, indicated by (370*i–n*) are spaced along conductor (202, 204). Each transmitter (370*i–n*) is under the control of controller (372). Controller (372) instructs one transmitter (370*i–n*) to insert a test signal onto conductor (202, 204). Receiver (374) receives the test signal and forwards an indication of the test signal to controller (372). By sequencing through transmitters (370*i–n*) for transmission of a test signal, controller (372) can determine the segment of track which contains a defect.

Figure 27:
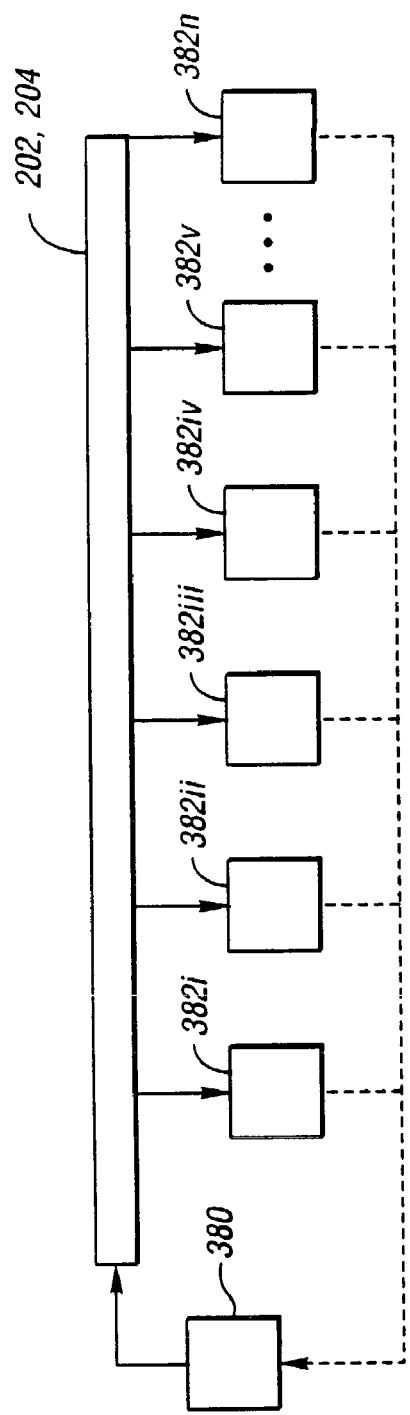
FIG. 27 is a schematic diagram illustrating track fault detection with a plurality of signal receivers.

Referring now to FIG. 27, a schematic diagram illustrating track fault detection with a plurality of signal receivers is shown. Transmitter (380) transmits a test signal onto conductor (202, 204). A plurality of receivers (382*i–n*) are located along conductor (202, 204). Each receiver (382*i–n*) transmits a signal indicative of the received test signal to transmitter (380). By examining the signals received from receivers (382*i–n*), transmitter (380) can determine the location of a defect along conductor (202, 204).

As will be recognized by one of ordinary skill in the art, any of the above methods for detecting track fault may be combined to produce a more robust fault detection system.

Figure 28:
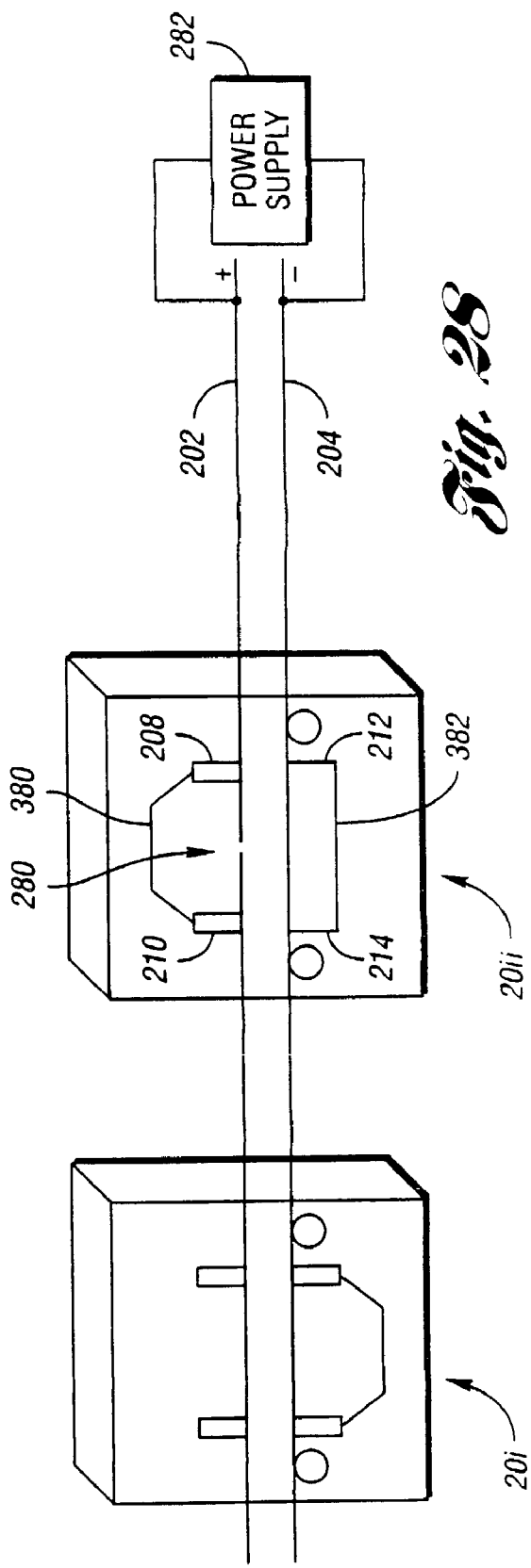
FIG. 28 is a schematic diagram illustrating rail anomaly recovery.

Referring now to FIG. 28, a schematic diagram illustrating rail anomaly recovery according to an embodiment of the present invention is shown. Anomaly (280) in one or more conductor (202, 204) may prevent power from power supply (282) from extending beyond anomaly (280). In this case, robotic device (20*i*) located beyond anomaly (280) will be cut off from power supply (282). This may render robotic device (20*i*) inoperative.

This problem may be remedied by moving a second robotic device, indicated (20*ii*), over defect (280) in conductor (202, 204). Current flows along conductor (202), into brush (208), through conductive path (380), out brush (210) and onto conductor (202) separated by defect (280). Similarly, current flows through separated section of conductor (204), into brush (214), through conductive path (382), out of brush (212) and onto conductor (204) before defect (280). In this case, brush 212, conductive path 282 and brush 214 are constructed as a wide conductor capable of bridging defect 280. This wide conductor may be implemented as a single, wide conductive brush or bar.

This provides yet another method of detecting anomaly (280) in conductor (202, 204). As robotic device (20*ii*) moves along conductor (202, 204), the point at which robotic device (20*i*) becomes operative indicates the location of defect (280). The location of defect (280) can then be stored in memory. Any robotic device (20) can then be moved back to the location of defect (280) to provide power to decoupled conductor sections (202, 204).

In another embodiment of the present invention, brushes (208, 210) are a single wide conductor capable of spanning defect (280), eliminating the need for conductor 380 between brushes 212, 214.

Figure 29:
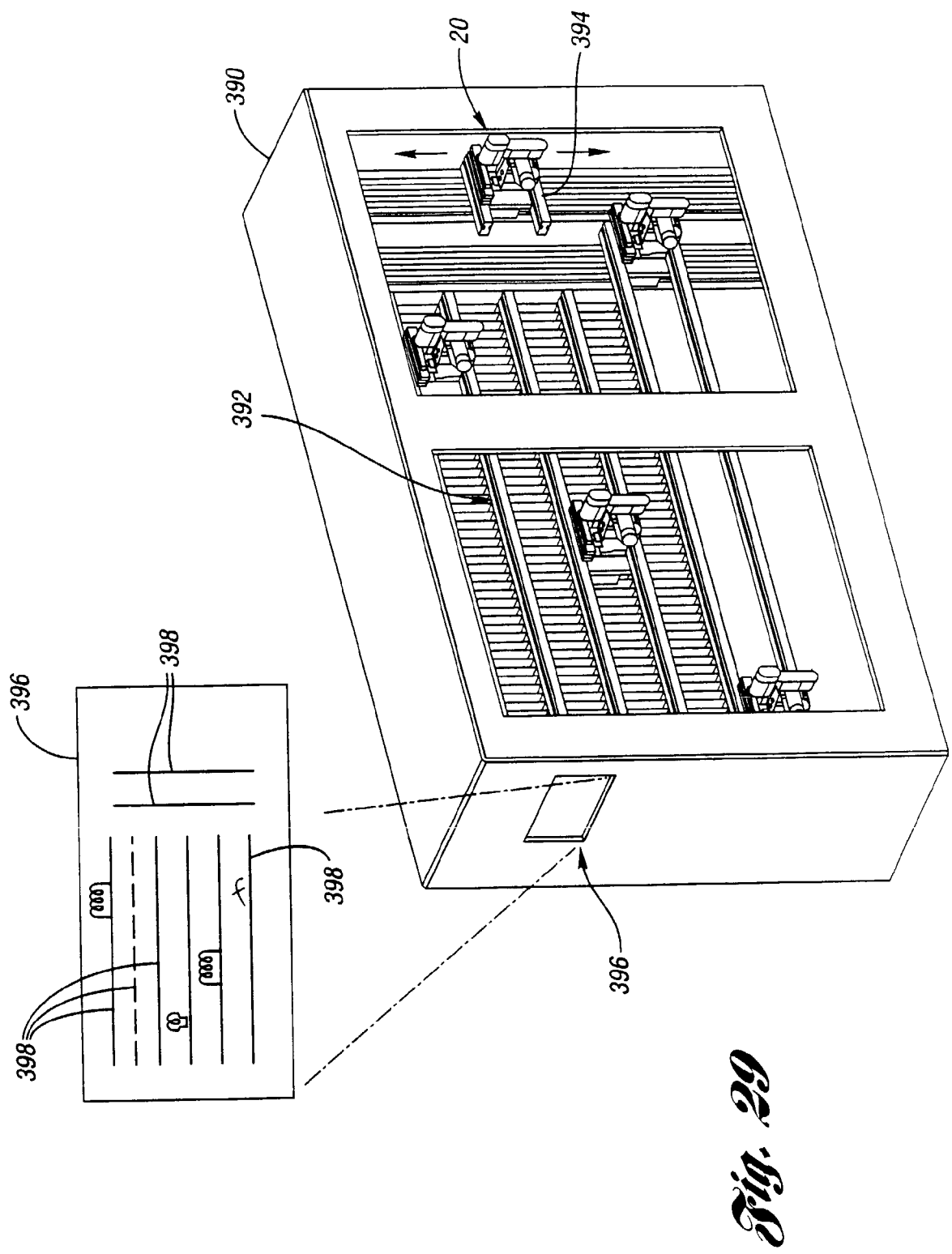
FIG. 29 is an illustration of a linear data storage library with a graphical display.

Referring now to FIG. 29, an illustration of a linear data storage library with a graphical display is shown. Storage library (390) includes a plurality of horizontal tracks (392). Robotic devices (20) travel along horizontal tracks (392) to access media storage locations and media access devices. Storage library (390) also includes several elevators (394) transporting robotic devices (20) between horizontal tracks (392).

Storage library (390) also includes graphical display (396) having a plurality of display elements (398). Each display element (398) represents one rail segment. Each rail segment may be a single horizontal track (392) or elevator (394). Rail segments may also include sections of a horizontal track (392) or elevator (394). These sections may be physical divisions of tracks (392) and elevator (394), such as sections between joints or levels, or may be logical divisions created for ease of display or to otherwise logically divide tracks (392) and elevators (394). Each display element (398) is positioned relative to other display elements (398) to reflect positioning of corresponding tracks (392) and elevators (394) within data storage library (390). Display (396) is updated based on data generated to describe the use of each track (392) and elevator (394).

Various conditions may be displayed. These include mechanical condition, electrical condition, communication status, temperature, ease of use, and distance traveled by robotic devices (20) for each track (392), elevator (394) or segment thereof.

Figure 30:
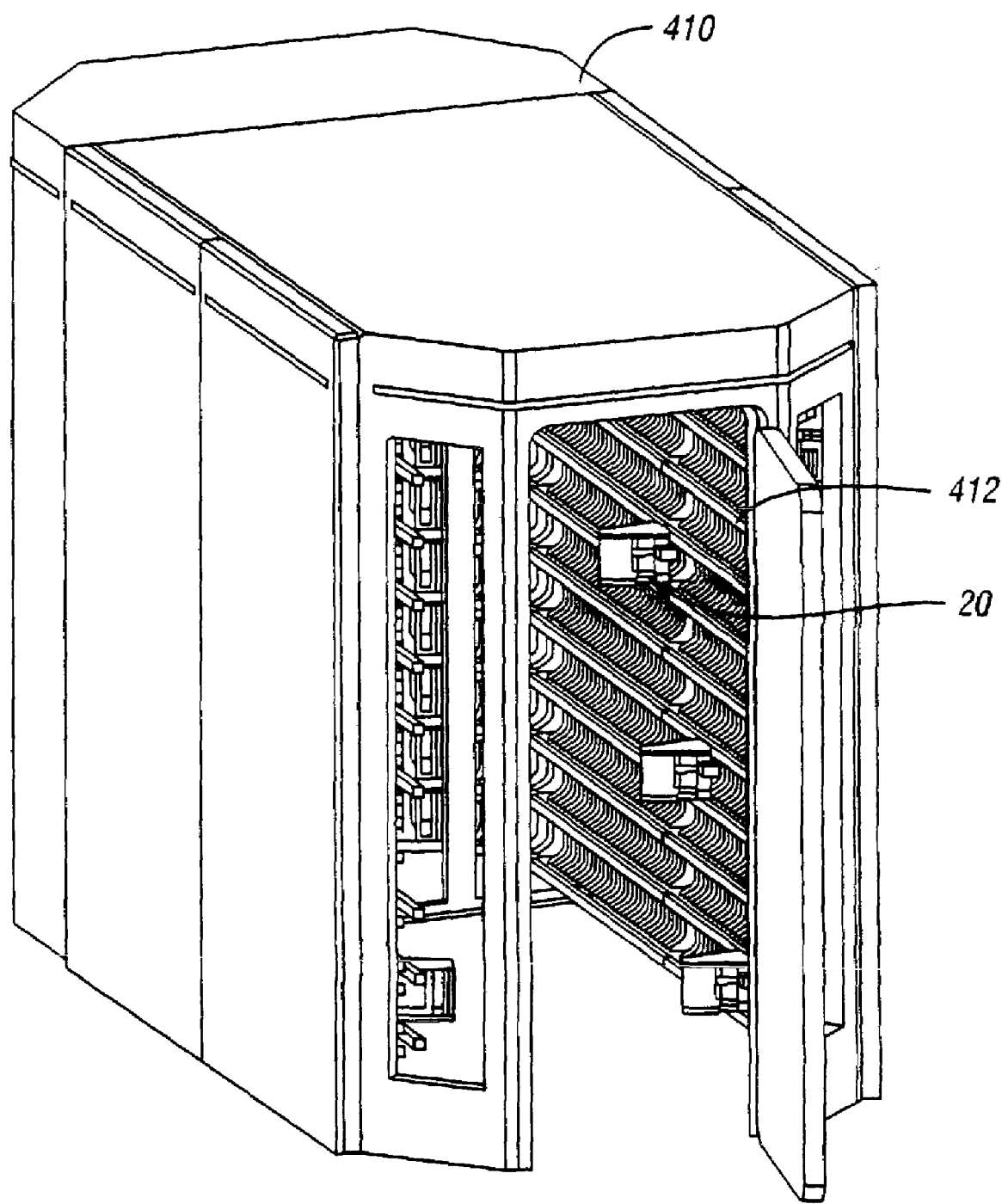
FIG. 30 is an illustration of a data storage library with curved tracks.

Referring now to FIG. 30, an illustration of a data storage library with curved tracks is shown. Storage library (410) includes a plurality of tracks (412) which extend along one side, curve to extend across the library and then extend along the other side. A plurality of robotic devices (20) run along tracks (412). Storage library (410) also includes several elevators not seen in this view. Storage library (410) further includes a plurality of media access devices for reading data from and writing data to media held within library (410).

Figure 31:
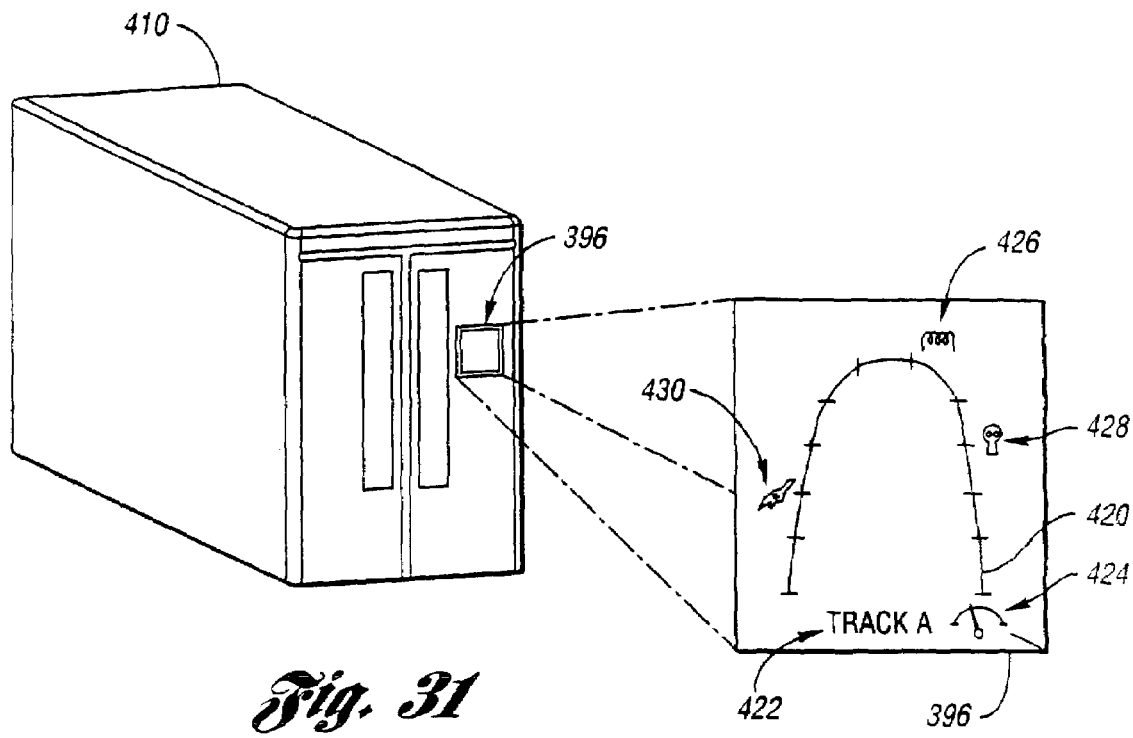
FIG. 31 is an illustration of a curved track data storage library with a graphical display.

Referring now to FIG. 31, an illustration of a curved track data storage library with a graphical display is shown. Storage library (410) includes graphical display (396) showing one or more tracks (412) displayed as track segments, one of which is indicated by (420). Track segments (420) are arranged on graphical display (396) to correspond with the actual positions of the portions of track represented by each track segment (420) inside of library (410). The example shown in FIG. 31 illustrates a single track (412) with eleven track segments (420). Track designation (422) indicates which track (412) is displayed. Virtual meter (424) indicates the current drawn from conductors running along track (412). Various symbols are located on or near track segments (420) to indicate status such as, for example, position of robotic device (426), electrical fault indicator (428), communications fault indicator (430), and the like.

Figure 32:
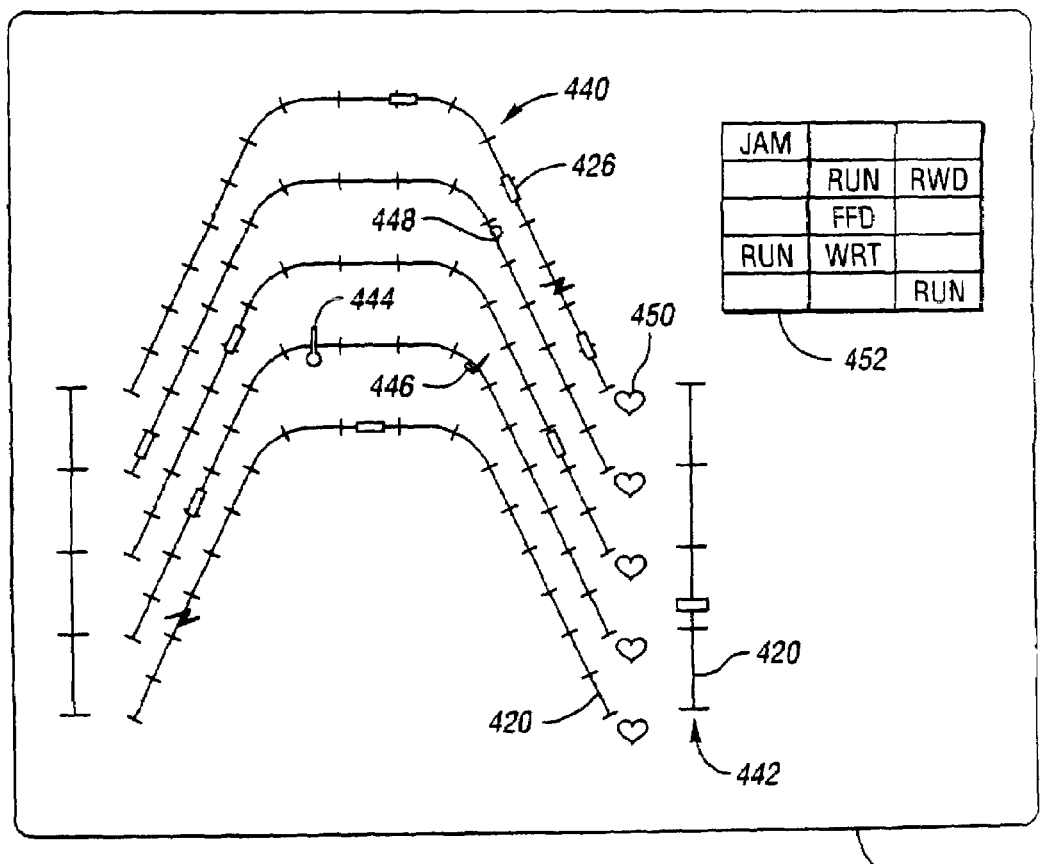
FIG. 32 illustrates a graphical display for a multi-track data storage library.

Referring now to FIG. 32, a graphical display for a multi-track data storage library is shown. Graphical display (396) allows all tracks (412) in library (410) to be displayed simultaneously. Representation of tracks are displayed to reflect the relative positions of these tracks within library (410). Symbols displayed on display (396) include track symbols (440), track segment symbols (420), robotic device positions (426), elevator symbols (442), temperature range error symbols (444), status check in progress symbols (446), condition unknown symbols (448), and the like. Heartbeat symbols (450) indicate system components are generating regular heartbeat signals. These typically include communication links. Access device indicators (452) indicate the status of media access devices.

Figure 33:
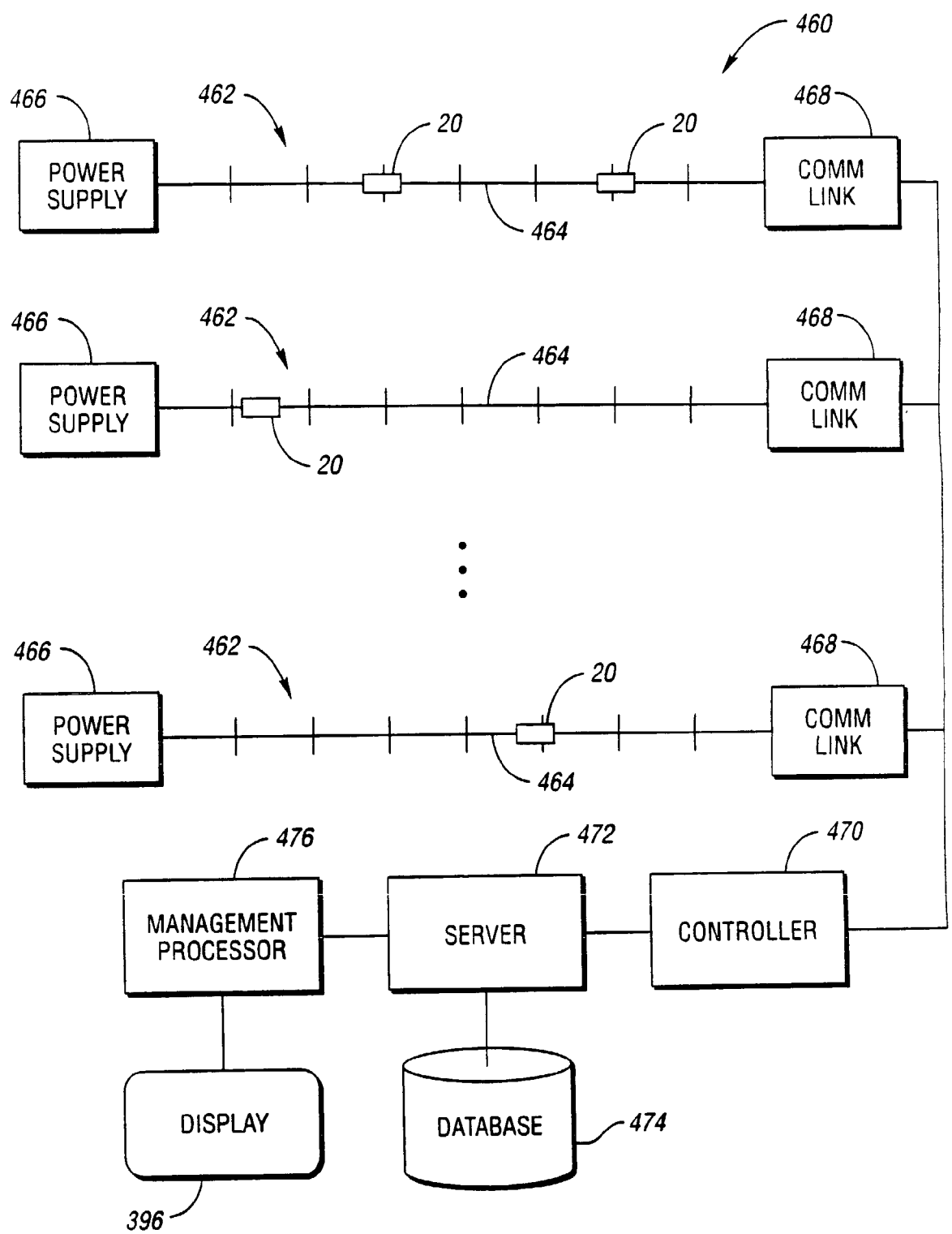
FIG. 33 is a block diagram illustrating a data storage system with track-based status monitoring.

Referring now to FIG. 33, a block diagram illustrating a data storage system with track-based status monitoring is shown. A data storage system, shown generally by (460), includes a plurality of tracks (462) with each track (462) divided into a plurality of segments (464). Segments (464) may correspond with physical divisions such as, for example, track joints, or may be logical designations to assist in gathering or displaying status information. Robotic devices (20) travel along tracks (462) to transport data storage media. Typically, each track (462) has one or more power supply (466) supplying power to robotic devices (20). Each track (462) may also include communication link (468, comm link) in communication with robotic devices (20) and other means for determining the status of segments (464) as provided above. Communication links (368) are in communication with controller (470). Controller (470) controls the operation of each robotic device (20) and receives information about the status of each segment (464) through communication link (468). Server (472) interfaces database (474) with controller (470). Database (472) includes information about each segment (464). Database (474) is updated by controller (470) on the use of each segment (464) by robotic devices (20). Management processor (476) also accesses database (474) through server (472). Management processor (476) generates data describing the use and status of each rail segment (464). This information is displayed by management processor (476) on display (396).

Database (474) may contain a variety of additional information. For example, database (474) may contain impedance values taken for each track segment (464) when that segment (464) was known to be operational. Database (474) may also contain locations of known anomalies along tracks (462). Various thresholds for determining the health of elements within data storage system (460) may also be held in database (474).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for detecting a track anomaly in an automated data storage library, the method comprising:
    moving a robotic device along the track;
    contacting a conductor on the track with a pair of pickups moved by the robotic device;
    sensing impedance of the conductor between the pair of pickups; and
    determining track health based on the sensed conductor impedance.

2. A method for detecting a track anomaly as in claim 1 wherein the track comprises a plurality of sections of interest, the method further comprising:
    determining as a reference impedance the conductor impedance for each section of interest at a time when the track is operational; and
    remembering the reference impedance for each section of interest.

3. A method for detecting a track anomaly as in claim 2 wherein determining track health comprises comparing the sensed conductor impedance for a section of interest with a corresponding remembered reference impedance.

4. A method for detecting a track anomaly as in claim 1 wherein sensing impedance comprises measuring resistance between the pair of pickups.

5. A method for detecting a track anomaly as in claim 1 wherein sensing impedance comprises taking measurements at a plurality of frequencies.

6. A method for detecting a track anomaly as in claim 1 wherein the conductor carries electrical current supplying power to the robotic device.

7. A method for detecting a track anomaly as in claim 1 wherein the conductor carries commands sent to the robotic device.

8. A method for detecting a track anomaly as in claim 1 further comprising transmitting a signal indicative of track health along the conductor.

9. A data storage library comprising:
    a plurality of storage locations for holding data storage media disposed within the library;
    at least one rail disposed within the library located to provide access to the storage locations;
    at least one conductor on each rail, each conductor carrying electrical current;
    at least one robotic device mounted to travel along the at least one rail, each robotic device accessing storage media held in the storage locations;
    at least one pair of brushes on each robotic device, each brush conducting electrical current between the robotic device and the conductor; and
    electronics operative to determine an operating status of the conductor based on a measurement of impedance between each brush in the pair of brushes.

10. A data storage library as in claim 9 further comprising at least one controller controlling operation of at least one robotic device, the electronics operative to transmit a signal indicative of the operating status to the controller.

11. A data storage library as in claim 10 wherein the electronics transmit the signal through at least one of the conductors.

12. A data storage library as in claim 9 wherein the determination of the operating status of the conductor is further based on a reference impedance measurement.

13. A data storage library as in claim 9 wherein the measurement of impedance comprises a measurement of resistance between each brush in the pair of brushes.

14. A data storage library as in claim 9 wherein the measurement of impedance comprises measurements taken at a plurality of frequencies.

15. A method for detecting a track anomaly in a plurality of track sections by measuring an impedance of each section of track, the track providing access to data storage devices in an automated data storage library by supporting movement of at least one robotic device along the track.

16. A method for detecting a track anomaly as in claim 15 wherein measuring impedance of each section of track comprises:
    affixing a first electrical connection at a first end of the track section;

affixing a second electrical connection at a second end of the track section; and measuring the impedance between the first electrical connection and the second electrical connection.

17. A method for detecting a track anomaly as in claim 15 wherein measuring impedance of each section of track comprises measuring the impedance with at least one pickup located on a robotic device.

18. A method for detecting a track anomaly as in claim 15 wherein measuring the impedance comprises measuring the resistance.

19. A method for detecting a track anomaly as in claim 15 wherein measuring the impedance is based on measurements taken at a plurality of frequencies.

* * * * *